(12) United States Patent
Ferguson et al.

(10) Patent No.: US 7,451,071 B2
(45) Date of Patent: Nov. 11, 2008

(54) DATA MODEL FOR AUTOMATED SERVER CONFIGURATION

(75) Inventors: Glenn Ferguson, San Jose, CA (US); Raymond Suorsa, Los Gatos, CA (US); Christopher Dorsey, Fremont, CA (US); Daniel Taner Halicioglu, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1207 days.

(21) Appl. No.: 09/766,615

(22) Filed: Jul. 26, 2001

(65) Prior Publication Data

US 2002/0082819 A1 Jun. 27, 2002

Related U.S. Application Data

(62) Division of application No. 09/699,353, filed on Oct. 31, 2000, now abandoned.

(51) Int. Cl.
*G06F 9/45* (2006.01)
(52) U.S. Cl. ......................... 703/22; 709/220
(58) Field of Classification Search .............. 709/224, 709/220, 213; 370/469; 703/22; 715/733, 715/736
See application file for complete search history.

(56) References Cited

U.S. PATENT DOCUMENTS

| | | | |
|---|---|---|---|
| 5,175,800 A | 12/1992 | Galis | |
| 5,249,274 A | 9/1993 | Sztipanovits et al. | |
| 5,295,244 A | 3/1994 | Dev | |
| 5,650,994 A | 7/1997 | Daley | |
| 5,655,081 A | 8/1997 | Bonnell et al. | |
| 5,742,829 A | 4/1998 | Davis et al. | |
| 5,748,896 A | 5/1998 | Daly | |
| 5,752,042 A | 5/1998 | Cole et al. | |
| 5,781,703 A | 7/1998 | Desai et al. | |
| 5,832,503 A | 11/1998 | Malik et al. | |
| 5,835,911 A | 11/1998 | Nakagawa et al. | |
| 5,838,907 A | 11/1998 | Hansen | |
| 5,870,751 A | 2/1999 | Trotter | |
| 5,872,928 A | 2/1999 | Lewis et al. | |
| 5,920,567 A | 7/1999 | Saito et al. | |

(Continued)

FOREIGN PATENT DOCUMENTS

JP 2-204837 8/1990

(Continued)

OTHER PUBLICATIONS

Rabinovich et al., M. RaDaR: a scalable architecture for a global Web hosting service, Computer Networks, vol. 31, Nos. 11-16, May 1999, pp. 1545-1561.*

(Continued)

*Primary Examiner*—Russell Frejd

(57) ABSTRACT

The present invention is directed to a data model. The data model allows for modeling of all information relating to a computer network to be conveniently stored in a database in a manner which minimizes the effort associated with the addition of new devices to the network and maximizes software code reuse. The information relating to the network that may be modeled in the data model of the present invention include: software information, configuration information, monitoring information, hardware information, domain name server (DNS) information, network information, and information regarding queues that may be used by business logic, or intelligent agents in accessing and maintaining various portions of the network.

14 Claims, 13 Drawing Sheets

U.S. PATENT DOCUMENTS

| | | | |
|---|---|---|---|
| 5,944,782 A | 8/1999 | Noble |
| 5,996,010 A | 11/1999 | Leong et al. |
| 6,009,274 A | 12/1999 | Fletcher et al. |
| 6,012,100 A | 1/2000 | Frailong |
| 6,021,437 A | 2/2000 | Chen |
| 6,023,464 A | 2/2000 | Woundy |
| 6,029,196 A | 2/2000 | Lenz |
| 6,052,720 A | 4/2000 | Traversat |
| 6,067,582 A | 5/2000 | Smith |
| 6,088,797 A | 7/2000 | Rosen |
| 6,098,097 A | 8/2000 | Dean |
| 6,108,420 A | 8/2000 | Larose |
| 6,123,737 A | 9/2000 | Sadowsky |
| 6,125,388 A | 9/2000 | Reisman |
| 6,128,729 A | 10/2000 | Kimball |
| 6,134,593 A | 10/2000 | Alexander |
| 6,138,153 A | 10/2000 | Collins, III et al. |
| 6,167,358 A | 12/2000 | Othmer et al. |
| 6,167,567 A | 12/2000 | Chiles |
| 6,185,466 B1 | 2/2001 | Nicewonger |
| 6,192,354 B1 | 2/2001 | Bigus |
| 6,202,206 B1 | 3/2001 | Dean |
| 6,226,679 B1 | 5/2001 | Gupta |
| 6,226,788 B1 | 5/2001 | Schoening |
| 6,243,396 B1 * | 6/2001 | Somers | 370/469 |
| 6,247,049 B1 | 6/2001 | Scott |
| 6,249,883 B1 | 6/2001 | Cassidy |
| 6,252,858 B1 | 6/2001 | Inoue |
| 6,259,448 B1 * | 7/2001 | McNally et al. | 715/733 |
| 6,266,335 B1 | 7/2001 | Bhaskaran |
| 6,266,809 B1 | 7/2001 | Craig |
| 6,286,038 B1 | 9/2001 | Reichmeyer et al. |
| 6,286,041 B1 | 9/2001 | Collins, III |
| 6,304,549 B1 | 10/2001 | Srinivasan et al. |
| 6,304,790 B1 | 10/2001 | Nakamura et al. |
| 6,314,565 B1 | 11/2001 | Kenner |
| 6,330,586 B1 | 12/2001 | Yates et al. |
| 6,345,239 B1 | 2/2002 | Bowman-Amuah |
| 6,347,398 B1 | 2/2002 | Parthasarathy |
| 6,349,306 B1 | 2/2002 | Malik |
| 6,381,628 B1 | 4/2002 | Hunt |
| 6,389,126 B1 | 5/2002 | Bjornberg et al. |
| 6,389,464 B1 * | 5/2002 | Krishnamurthy et al. | 709/220 |
| 6,393,386 B1 | 5/2002 | Zager |
| 6,396,810 B1 | 5/2002 | Hebel |
| 6,411,961 B1 | 6/2002 | Chen |
| 6,418,555 B2 | 7/2002 | Mohammed |
| 6,421,719 B1 | 7/2002 | Lewis et al. |
| 6,463,528 B1 | 10/2002 | Rajakarunanayake et al. |
| 6,502,131 B1 | 12/2002 | Vaid |
| 6,516,337 B1 | 2/2003 | Tripp |
| 6,516,347 B1 | 2/2003 | Nakamura |
| 6,535,227 B1 * | 3/2003 | Fox et al. | 715/736 |
| 6,546,392 B1 | 4/2003 | Bahlmann |
| 6,546,553 B1 | 4/2003 | Hunt |
| 6,549,944 B1 * | 4/2003 | Weinberg et al. | 709/224 |
| 6,577,614 B1 | 6/2003 | Cook et al. |
| 6,594,723 B1 | 7/2003 | Chapman |
| 6,598,090 B2 | 7/2003 | Champlin |
| 6,604,238 B1 | 8/2003 | Lim |
| 6,618,366 B1 | 9/2003 | Furukawa |
| 6,633,907 B1 | 10/2003 | Spencer |
| 6,662,221 B1 | 12/2003 | Gonda et al. |
| 6,686,838 B1 | 2/2004 | Rezvani |
| 6,708,195 B1 | 3/2004 | Borman |
| 6,728,748 B1 | 4/2004 | Mangipudi |
| 6,732,269 B1 | 5/2004 | Baskey |
| 6,738,908 B1 | 5/2004 | Bonn |
| 6,754,707 B2 | 6/2004 | Richards |
| 6,775,830 B1 | 8/2004 | Matsunami |
| 6,801,949 B1 | 10/2004 | Bruck |
| 6,802,061 B1 | 10/2004 | Parthasarathy et al. |
| 6,816,903 B1 | 11/2004 | Rakoshitz |
| 6,816,964 B1 | 11/2004 | Suzuki |
| 6,826,604 B2 | 11/2004 | Yamaguchi |
| 6,834,389 B1 | 12/2004 | Glass |
| 6,880,086 B2 | 4/2005 | Kidder et al. |
| 6,983,317 B1 | 1/2006 | Bishop |
| 6,986,133 B2 | 1/2006 | O'Brien |
| 7,124,289 B1 | 10/2006 | Suorsa |
| 2002/0010773 A1 | 1/2002 | Meleis |
| 2002/0035501 A1 | 3/2002 | Handel |
| 2002/0062334 A1 | 5/2002 | Chen et al. |
| 2002/0082818 A1 * | 6/2002 | Ferguson et al. | 703/22 |
| 2002/0082820 A1 * | 6/2002 | Ferguson et al. | 703/22 |
| 2002/0082821 A1 * | 6/2002 | Ferguson et al. | 703/22 |
| 2002/0083146 A1 * | 6/2002 | Ferguson et al. | 709/213 |
| 2002/0095522 A1 | 7/2002 | Hayko et al. |
| 2002/0143904 A1 | 10/2002 | Bair |
| 2002/0154751 A1 | 10/2002 | Thompson |
| 2002/0194584 A1 | 12/2002 | Suorsa |
| 2005/0044544 A1 | 2/2005 | Slivka et al. |

FOREIGN PATENT DOCUMENTS

| | | |
|---|---|---|
| JP | 11-191116 | 7/1999 |
| WO | WO9108542 A | 6/1991 |
| WO | WO9826548 | 6/1998 |
| WO | WO9847057 | 10/1998 |
| WO | WO9853397 | 11/1998 |

OTHER PUBLICATIONS

Aggarwal et al., S. A flexible multicast routing protocol for group communication, Computer Networks, vol. 32, No. 1, Jan. 2000, pp. 35-60.*

Perkins, C.E. Mobile IP joins forces with AAA, IEEE, Personal Communications, vol. 7, No. 4, Aug. 2000, pp. 59-61.*

Paul Anderson, Towards a High Level Machine Configuration System, Proc. Eighth USENIX Sys. Admin. Conference (LISA), Sep. 19-23, 1994, pp. 19-26, San Diego, CA, USA.

Imazu Hideyo, Omniconf—Making OS Upgrades and Disk Crash Recovery Easier, Proc. Eighth USENIX Sys. Admin. Conference (LISA), Sep. 19-23, 1994 pp. 27-32, San Diego, CA, USA.

Michael Fisk, Automating the Administration of Heterogeneous LANs, Proc. Tenth USENIX Sys. Admin. Conference (LISA X), Sep. 29-Oct. 4, 1996, pp. 181-186, Chicago, IL, USA.

Dave Winer, XML-RPC Specification, Jun. 15, 1999, available at <http://www.xmlrpc.com/spec>, pp. 1-7.

David K. Hess et al., A Unix Network Protocol Security Study: Network Information Service, Technical Report, 1992, A&M University, Texas, USA, pp. 1-5.

"Oracle Intelligent Agent User's Guide", Oracle Corporation Sep. 2000, 95 pages.

Anderson, "Towards a High-Level Machine Configuration System" Sep. 1994, pp. 19-26.

Bredin, "Market-based Resource Control for Mobil Agents" May 1998, pp. 1-8.

Shirey, R. "Internet Security Glossary" May 2000, pp. 1 and 149. Entry for "SSL" Date unknown, p. 695.

Gilmore, C. "Secure Remote Access to an Internet Web Server" Nov./Dec. 1999, pp. 31-37.

Jun Xu, "Networked Windows NT System Field Failure Data Analysis" Date unknown, pp. 1-8.

Pidd et al. "Component-Based Simulation on the Web" Dec. 1999, pp. 1438-1444.

Symborski, C.W., "Updating Software and Configuration Data in a Distributed Communications Network" 1988, pp. 331-335.

Yan, "The SIFT Information Dissemination System" Dec. 1999 pp. 1-39.

* cited by examiner

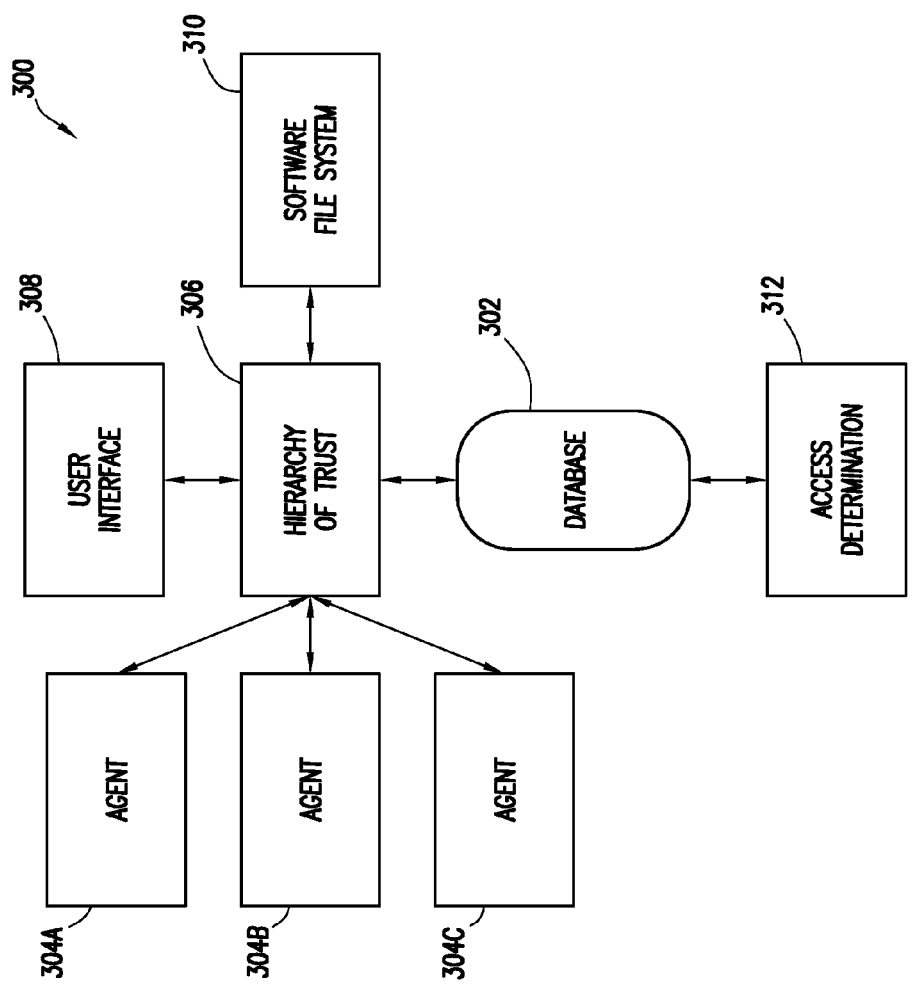
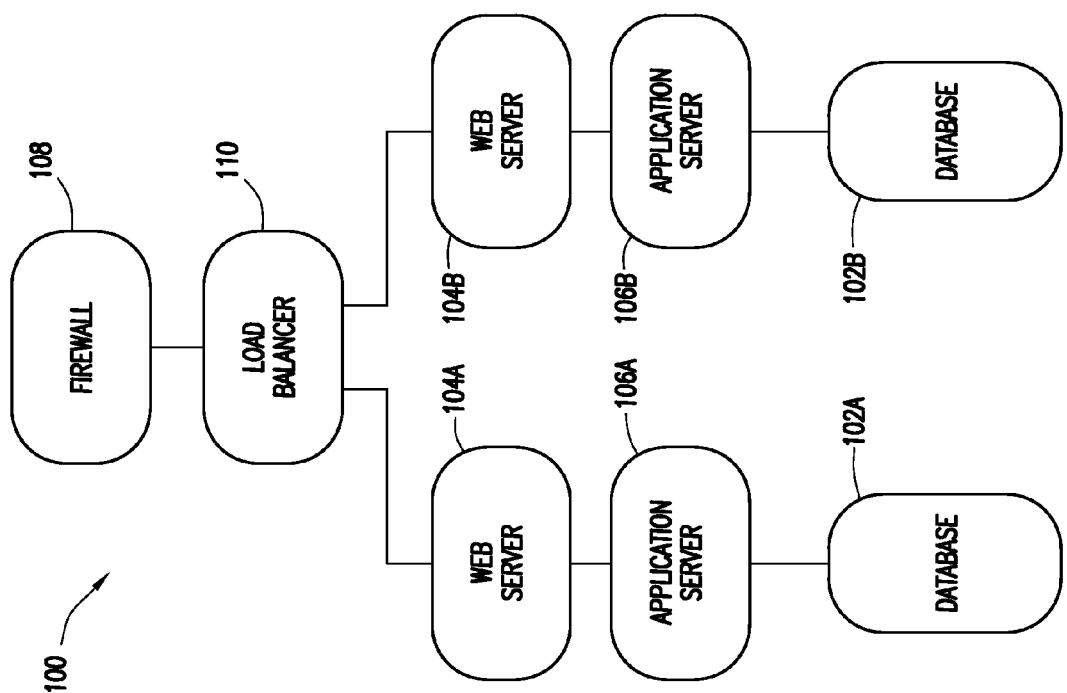

DATA MODEL FOR AUTOMATED SERVER CONFIGURATION

BACKGROUND

The present invention is directed to the provisioning, or configuration, of servers and other devices that provide support for sites that are hosted on the Internet, intranets, and other communication networks. More particularly, the present invention is directed to a data model which can be implemented using a database and which serves as a repository for information pertinent to the provisioning or configuration, of devices on a communications network.

The growing popularity and increasing accessibility of the Internet has resulted in its becoming a major source of information, as well as a vehicle for inter-party transactions, in a variety of environments. For instance, a number of different types of entities, from government agencies to school systems to organized groups, host Internet and/or intranet websites that provide informational content about themselves and topics related to their interests. Similarly, commercial enterprises employ websites to disseminate information about their products or services, as well as conduct commercial transactions, such as the buying and selling of goods. To support these activities, each website requires an infrastructure that stores the information provided by that site, responds to user requests for the information, and conducts other types of transactions appropriate to the site. A significant component of this infrastructure is a web server, which receives requests for information, retrieves it from the appropriate sources, and provides it to the requester. Websites which provide more complex services, such as online ordering, may also include application servers to support these additional functions.

In the case of relatively small entities, the infrastructure to support a website may be as simple as a single server, or even a portion of a server. Conversely, a large, popular website that consists of several thousand pages of information and that is accessed quite frequently may require numerous web servers to provide the necessary support. Similarly, websites for commercial entities, via which transactional operations are conducted, may employ multiple application servers to support transactions with a large number of customers at one time.

The present invention is particularly directed to a data model which supports a website by facilitating provisioning of the servers, allowing appropriate software necessary for the site to be identified, located, and transferred to a server, and generally defining all aspects of the network. Such provisioning initially occurs when the website is first launched. Thereafter, there may be a need for further provisioning, particularly in the case of a successful website, when additional servers must be added to support increased traffic, which requires accurate modeling of all aspects of the network. In another instance, provisioning of the servers may be required as part of a disaster recovery operation, for example a sudden interruption in power, an attack by a hacker, or corruption of stored software and/or data. In such an instance, it would be necessary to have an accurate model of all aspects of the server to allow for accurate reproduction of the server in need of recovery.

The provisioning of a server or other device that supports the operation of a website involves several discrete steps. First, the appropriate operating system software must be loaded onto the device, followed by networking software that enables the device to communicate over a network. Thereafter, software applications that are required to support the particular site are loaded, such as database software for retrieving web pages, credit card processing software, order processing software, etc. Finally, the content associated with the individual pages of the website must be loaded. The order in which these various components are loaded onto the server can be quite critical, to ensure compatibility of the various programs with one another.

In the past, the provisioning of web servers was often carried out manually. In other words, each item of software was individually loaded onto the server by a person having responsibility for that task. One problem with such an approach is the fact that it consumes a significant amount of time. For a relatively large site that is supported by multiple servers, the provisioning could take several hours or days to be completed, thereby delaying the time before the site can be launched and/or upwardly scaled to accommodate increasing traffic. Another, and perhaps more significant, limitation associated with the manual provisioning of devices is the lack of repeatability in the software configurations. More particularly, whenever manual operations are involved in the installation of software, there is always the possibility of human error, such as the failure to install one of the required components, or the loading of the various items of software in the wrong order. Each of these types of errors can result in misoperation or total failure of the website, and can be extremely time consuming to discover and correct.

To overcome some of these limitations, various techniques have been developed which permit software to be automatically deployed to computers. However, these techniques are limited in the types of environments in which they can be utilized. For example, in an enterprise where all of the users interact with the same legacy applications, a "cookie cutter" type of approach can be used to deploy the software. In this approach, every computer can have the same, standard configuration. Once the configuration has been developed, therefore, it can be packaged into a fixed format, and automatically disseminated to all of the appropriate computers.

However, this type of automated deployment is not effective for situations in which computers, such as servers, need to be customized to accommodate the individual requirements of varied users. One example of such a situation is a data center which may house the infrastructure for hundreds of different websites. The hardware and software requirements for these sites will vary among each site. For instance, different website developers may employ different platforms for the sites, thereby necessitating various combinations of operating systems and application programs on the servers of the respective sites. Furthermore, different types of equipment may be utilized for the sites, thereby adding to the complexity of the provisioning process. In some cases, the same site may require a variety of different hardware devices, operating systems and application programs to handle all of the different services provided by that site. Known approaches to automate software deployment are not adapted to the needs of these types of situations. Rather, because of the flexibility that is required to accommodate a different configuration of hardware and/or software for each site, manual provisioning is still being practiced to a large extent, with all of its attendant disadvantages.

It is desirable, therefore, to provide a data model to support the automated provisioning of servers and other devices that support various types of services, such as the hosting of an Internet or intranet website. Such a data model should exhibit sufficient flexibility to accommodate the differing needs of the providers of such services, while maintaining repeatability, and hence reliability, in the provisioning process.

SUMMARY

In accordance with the present invention, the foregoing objectives are achieved by way of a data model to support the automated provisioning of servers and other devices that support various types of services, such as hosting of an Internet or intranet website. This data model provides relationships between various software, configuration, monitoring, hardware, network, domain name server (DNS), and queues entities. By representing the model in an entity relationship form, the present invention facilitates allowing access to and configuration of each aspect of a database which implements the model and thus, to each aspect of the network. This, in turn, allows for automated provisioning by devices located remotely on the network with which the data model of the present invention is associated.

The central database which implements the data model of the present invention contains all information that is relevant to the provisioning of devices contained on the network. This information includes information regarding the hardware devices used on the network, the software components that make up the various software roles installed on a device, logical network information such as IP addresses, configuration information of the various software, hardware, and network components, domain name information, and the like. Additionally, information regarding monitoring status of the network, and devices contained thereon is provided for. Additionally, an interface for various network agents associated with each host on the network for reporting configuration regarding devices connected to the network, reporting version information, upgrading software contained thereon, and so forth, is provided for.

According to exemplary embodiments of the present invention, the data model allows for modeling of all information relating to a computer network to be conveniently stored in a database in a manner which minimizes the effort associated with the addition of new devices to the network and maximizes software code reuse. This is accomplished by designing a model wherein each of the model's entities interrelate and are characterized by variable sets which provide enough specificity to accurately characterize the network (or portion thereof) that the model is intended to capture. At the same time, however, these entities and their respective variables are sufficiently generic to readily permit the addition of, e.g., new software, new hardware devices, new monitoring techniques and equipment, new configurations, etc., without requiring the rewriting of software code which relies upon the model and the database implementation thereof. Moreover, the schema described herein facilitate the reuse of existing software code to interact with the database model regarding newly added software, hardware, configurations, etc. by virtue of this design aspect of the model.

Various segments of models according to exemplary embodiments of the present invention are separately implementable.

These and other features of the present invention are explained in greater detail hereinafter with reference to an exemplary embodiment of the invention illustrated in the accompanying drawings, wherein like components are designated by like reference numerals.

BRIEF DESCRIPTION OF THE DRAWINGS

FIG. 1 is block diagram of one embodiment of the hardware configuration for website hosting.

FIG. 3 is a block diagram of a website maintenance system, associated with one embodiment of the present invention.

DETAILED DESCRIPTION

Figure 2:
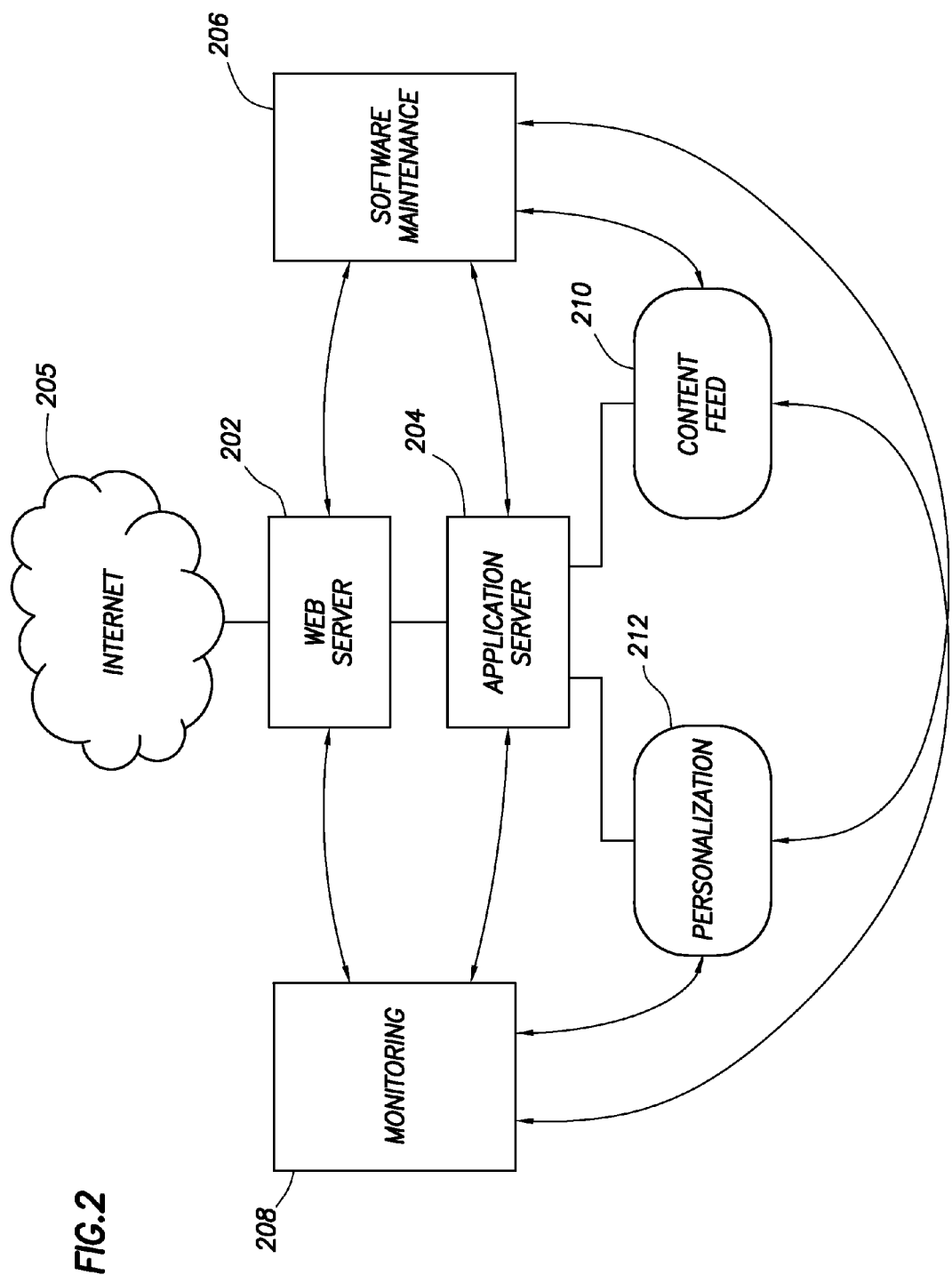
FIG. 2 is a block diagram of services associated with a network, in connection with one embodiment of the present invention.

To facilitate an understanding of the principles of the present invention, it is described hereinafter with reference to its application in a specific embodiment. Specifically, the data model of the present invention will be described within the context of a database which implements the model, which database is used in a computer network for the automated provisioning, and remote configuration and maintenance, of multiple computer devices connected to the network. It will be appreciated, however, that the implementation of the invention that is described hereinafter is merely exemplary, and that the invention can find practical application in any environment where it is desirable to model a database associated with a server on a computer network of any kind.

FIG. 1 illustrates, in block diagram form, the hardware configuration of one embodiment of the present invention. In FIG. 1, a typical, three-tier web hosting system 100, which may be implemented using the data model of the present invention, is illustrated. Therein, databases 102A, 102B are accessible to the web servers 104A, 104B, and the application servers 106A, 106B of the three-tier web hosting system 100 illustrated in FIG. 1. In the three-tier system 100 illustrated in FIG. 1, redundancy is used, whereby a duplicate web server 104B, application server 106B, and database 102B are each used as backups for the primary web server 104A, application server 106A, and database 102A, respectively.

Each of the web servers receives and handles requests received by way of a network. Requests received by way of such a network may require functionality from various applications. When this is the case, the web server 104A, 104B forwards the requests to the application server 106A, 106B, which may then process the application, and also has access to the database 102A, 102B. The application server 106A, 106B may, therefore, require information regarding software, configuration, monitoring, hardware, the network, DNS, or queues, which may be contained within the database 102A, 102B. This information is modeled by one embodiment of the present invention to allow for rapid and convenient access by the application server 106A, 106B to this information contained within the database 102A, 102B.

Network requests are received by the web server 104A, 104B by way of a firewall 108, and are distributed by the load balancer 110. The firewall 108 provides security from any malicious network forces outside the local access of the three-tier web hosting system, 100. Any remote host, or agent, which is outside the locality of the three-tier web hosting system 100 may be required to 10 authenticate itself to the firewall 108 in order to access, maintain, monitor, or reconfigure the web server 104A, 104B, the application server 106A, 106B, or the database 102A, 102B. The load balancer 110 distributes the network transactions received by way of the firewall 108.

It should be noted that a common practice is to insert an additional firewall between the application servers 106A, 106B and the databases 102A, 102B. While many people feel that this provides additional security, this redundancy is often not required if the firewall 108 is correctly configured. However, it should be noted that the present invention could be utilized in a system wherein a second firewall is used between the application servers 106A, 106B, and the databases 102A, 102B. The three-tier web hosting system 100 illustrated in FIG. 1 is a robust architecture, which is suitable for use in almost any business situation. Thus, the data model of the present invention finds utility in almost any business situation.

FIG. 2 is a block diagram illustrating the relationship of various services provided by a web hosting system in which the present invention can be implemented. The relationship model 200 illustrated in FIG. 2 comprises a variety of functional components, which relate to a web server 202, and an application server 204 connected to a network, such as the Internet 205. Functions relating to the web server 202 and the application server 204 include a software maintenance component 206, and a monitoring component 208. As illustrated by the bidirectional arrows in FIG. 2, the web server 202 and application server 204 may access information, and functionality, possessed by the software maintenance component 206 and the monitoring component 208. Likewise, the software maintenance component 206 and monitoring component 208 may provide the web server 202 and application server 204 with information, and may access information contained on the servers 202, 204.

The web server 202, which is in communication with the application server 204, may request functionality to be performed by various applications. This functionality may be subdivided into two categories: website content and personalized information. Website content is represented by the content feed component 210, and personalized information is represented by the personalization component 212, which are both in communication with the application server. Both the content feed component 210 and the personalization component 212 may be monitored by the monitoring component 208, and may receive software maintenance support from the software maintenance component 206. The manner in which the monitoring component 208, the software maintenance component 206, the network 205, the hardware devices 202, 204, and the configuration components 210, 212 are related is defined by the data model of the present invention.

According to an embodiment of the present invention, the web server 202 may comprise a layer 7 proxy server. The monitoring component 208 monitors the status of the hardware components, such as the web server 202 and application server 204, and monitors the content feed 210 and the personalization component 212. In response to this monitoring, the web server 202 or application server 204 may request the software maintenance component 206 to provide maintenance, which may be in the form of software updates, to any of the hardware components 202, 204, the content feed component 210, or the personalization component 212.

The content feed component 210 may communicate any information which is fed into the system 200, while the personalization component 212 provides data and information that is specific to a particular site hosted by a web server, or layer 7 proxy server 202. One example of information that is fed into the system 200 by way of the content feed component 210 is streaming data from an external source, such as stock market ticker data.

In FIG. 3, a system 300 is illustrated, which is suitable for automated provisioning, remote access and maintenance of network devices. Another system in which models according to the present invention can be implemented is described in U.S. Pat. No. 7,124,289, entitled "AUTOMATED PROVISIONING FRAMEWORK FOR INTERNET SITE SERVERS" to Raymond Suorsa et al. filed on an even date herewith, the disclosure of which is incorporated here by reference. A database 302 can be used to implement the data model according to exemplary embodiments of the present invention. This database 302 may reside on any large scale storage device. For example, suitable storage devices upon which the database associated with the data model of the present invention may be stored include redundant array of independent disks (RAID) systems, such as those provided by EMC Corporation of Hopkinton, Mass., or other similar devices. This database 302 may be accessed by the various agents 304A, 304B, 304C, whose level of access may be determined by a hierarchy of trust component 306. Additionally, a user interface 308 may be provided for the convenience of a user in accessing information contained within the database 302, or software contained within the software file system 310. The determination of the level of access granted by the user interface 308 is made by the hierarchy of trust component 306. Access determination information is stored by the access determination component 312, which is accessible by way of database 302. This is accomplished by using a hierarchical file structure in which specific access is determined and operated only to those users to whom it should be granted. This is accomplished by user authentication via a lightweight directory access protocol (LDAP) server that authenticates users within particular domain names that map to specific customer accounts. The hierarchy of trust component 306 interprets the data related to it from the database 302, and communicates this data, or the interpretation thereof to the various agents 304A, 304B, 304C, and/or the user interface 308.

Figure 4:
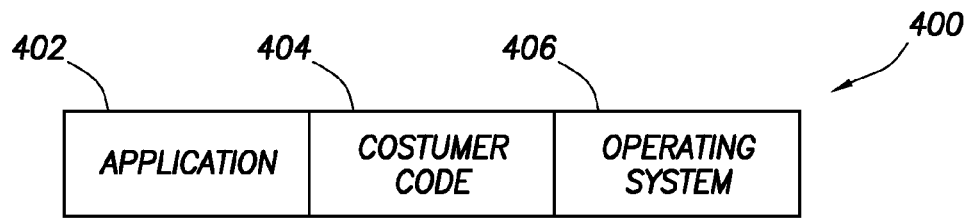
FIG. 4 is a block diagram of roles used in connection with one embodiment of the present invention.

In FIG. 4, a block diagram of a customer role package 400 is illustrated. Such customer role packages are used to provide repeatability, and eliminate the need for manual configuration by designating software components to be installed on a particular device connected to a network. Roles as illustrated in FIG. 4 define the functionality of device, and may be considered to define the role, or part, the device is to play within the network.

In one embodiment of the invention, the software components to be installed (i.e., the customer role package 400) are divided into three types of software roles that are related to the frequency with which they are likely to change or be upgraded. These roles include an application role 402, a customer code role 404, and an operating system (OS) role 406. The OS role 406 contains the software that has the lowest probability of being changed during the life cycle of the particular device on which it is installed. This role consists of the OS of the device, plus other general software, such as the intelligent agents 304A, 304B, 304C, illustrated in FIG. 3. The customer code role 404 contains content specific to, and provided by, a customer, and therefore contains software that can change on a regular basis for a website or other network site. Examples of software contained within the customer code role 404 might include hypertext markup language (HTML) pages, Java server pages (JSP), active server pages (ASP), image files, and other content that is regularly updated by a website host. The application role 402 consists of software components that change relatively infrequently when compared to software of the customer code role 404, but perhaps more often than software contained within the OS role 406. The hierarchical structure of such a customer role package 400 is described hereinafter in connection with FIG. 9.

Figure 5:
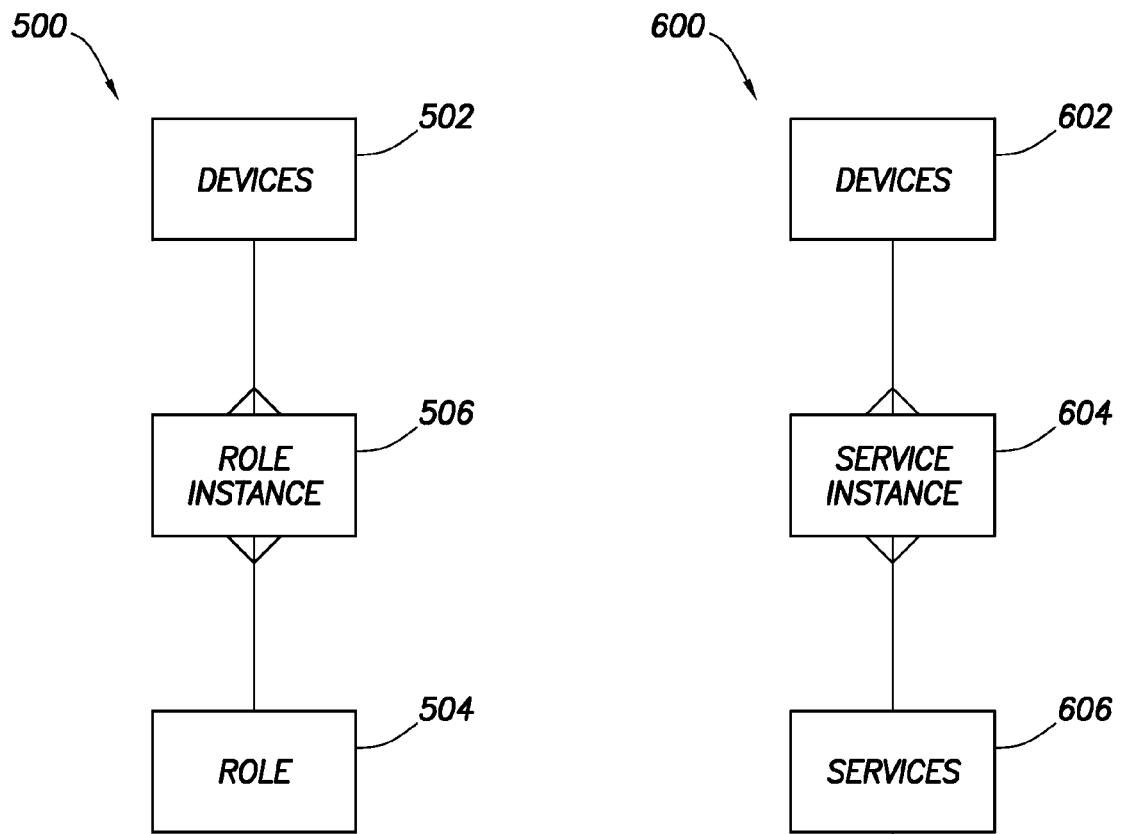
FIG. 5 is a role-centric entity relationship diagram, used in connection with one embodiment of the present invention.

An entity relationship diagram of a role-centric network model 500 is illustrated in FIG. 5. The role-centric model 500 is used for relating devices 502 connected to a network to software roles 504. This is accomplished by way of a role instance 506, which is used as a place holder for devices until a device 502 is present, and connected to the network by way of which the role 504 may communicate the software contained therein to the devices 502. This role-centric model 500 allowed for a role instance 506 that reserved IP addresses, or other network addresses, and allowed for general network configuration without the devices being attached to the network. Thus, the IP addresses used by the various devices connected to the network may be maintained, and need not be reassigned each time a device is reconnected to the network at a different location.

Entity relationship diagrams, such as the entity relationship diagram of the role-centric model 500, show the relationship between various entities, which are represented by rectangular blocks and labeled to indicate their significance connected by way of connection lines. Each connection line has a single connection on one end and multiple connections on the opposite end, indicating a one-to-many relationship. This means that a single entity is related to multiple entities on the end of the connection line having multiple connections. Thus, the devices entity 502 relates to the role instance entity 506 in a one-to-many fashion, meaning that each device entity 502 is directly related to many role instance entities 506. Additionally, the role entity 504 is related to the role instance entity 506 in a one-to-many relationship. Hence, each role entity 504 is related to multiple role instances 506.

Figure 6:
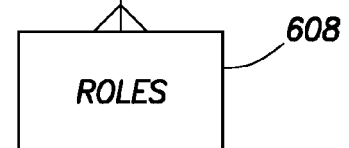
FIG. 6 is a service-centric entity relationship diagram, used in connection with one embodiment of the present invention.

FIG. 6 illustrates an improved approach to the traditional role-centric network model approach illustrated in FIG. 5. In FIG. 6, a service-centric network model 600 that allows one to monitor service information related to devices 602 associated with a computer network is shown. This type of model is accomplished, as illustrated in the entity relationship diagram of FIG. 6, by relating devices entities 602 to service instance entities 604 in a one-to-many relationship. The service instance entities 604 are then related to services 606 in a many-to-one relationship. The services entity 606 is related to the roles entity 608 in a one-to-many relationship. The service instance entities 604 act as a relationship table between the devices 602 and the services 606. The advantages of the service-centric model 600, which is employed by one embodiment of the present invention include all of the advantages of the role-centric model 500, illustrated in FIG. 5, as the network may be configured using place holders instead of devices connected to the network. The service-centric model has the additional advantage of relating the roles to services, which are an important quantity for customers to monitor and configure. An embodiment of the present invention utilizes a service-centric model, such as the one illustrated in FIG. 6.

Figure 7:
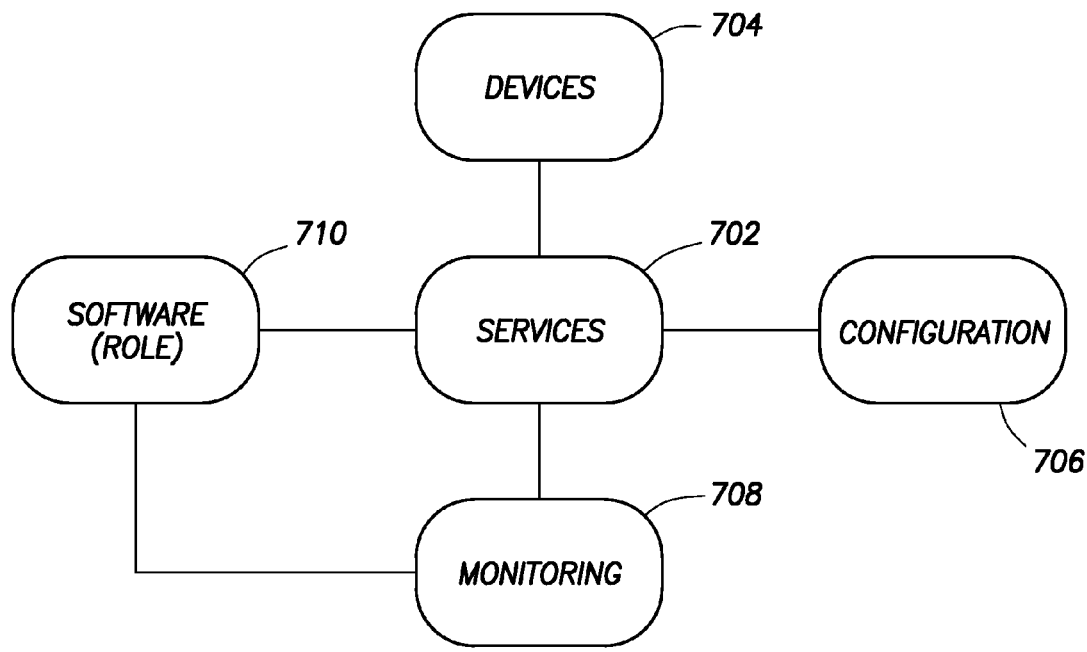
FIG. 7 is a block diagram illustrating the relationship between various elements of one embodiment of the present invention.

The block diagram in FIG. 7 illustrates a service-centric concept, relating services 702 to various other quantities associated with the network that in accordance with an embodiment of the present invention. The services 702 are centrally related to each of: the devices 704, the configuration component 706 of the network, the monitoring 708 of the network, hardware, and software, and the software 710, such as the OS software, packages, and roles hereinbefore described. By way of the service-centric system illustrated in FIG. 7, the monitoring component 708 may monitor the software component, ensuring that each of the software roles is properly maintained, and up to date.

Figure 8:
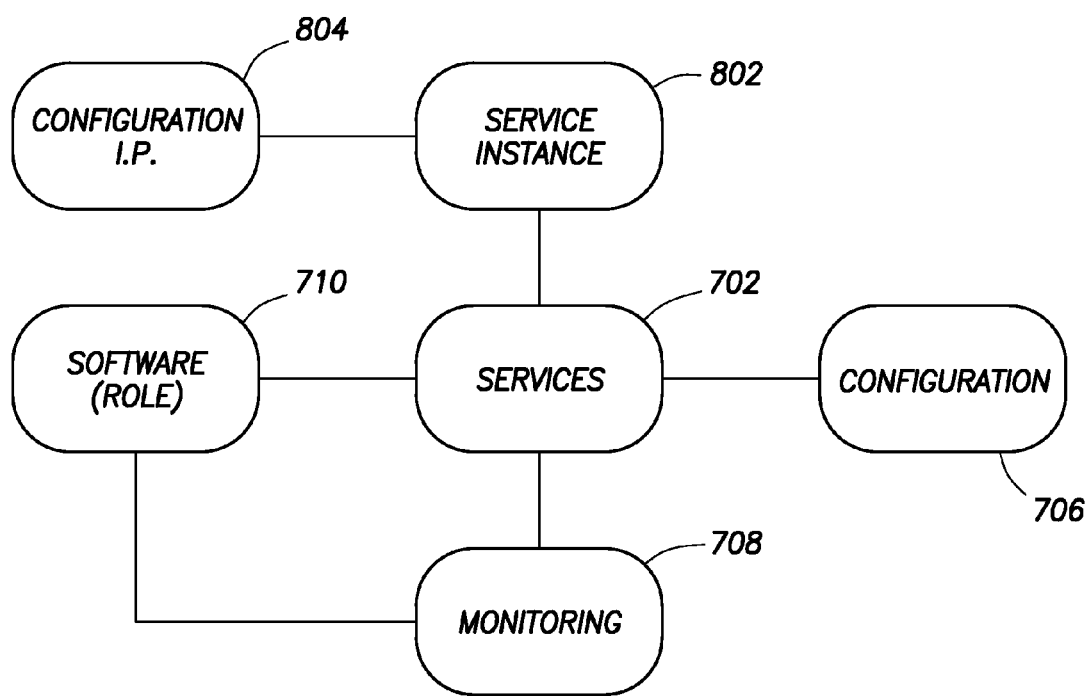
FIG. 8 is a block diagram illustrating the relationship between various elements of one embodiment of the present invention.

FIG. 8 illustrates a similar configuration, wherein services are centrally related to a configuration component 706, a monitoring component 708, and software 710. However, the service-centric relationship illustrated in FIG. 8 differs from the one illustrated in FIG. 7 in that the services 702 are not related directly to devices. Rather, the services 702 are related directly to a service instance 802, which allows for the configuration of an IP address by a configuration device. This service instance 802 is related to devices 804 upon which an IP is configured. Thus, although the services 702 in FIG. 8 are not directly related to devices, as is the case in FIG. 7, in FIG. 8, the services 702 are related to a service instance 802 which allows for the configuration of IP addresses until a device 804 may be configured with an IP address, and acts as a place holder for devices to be connected and utilize the IP addresses.

Figure 9:
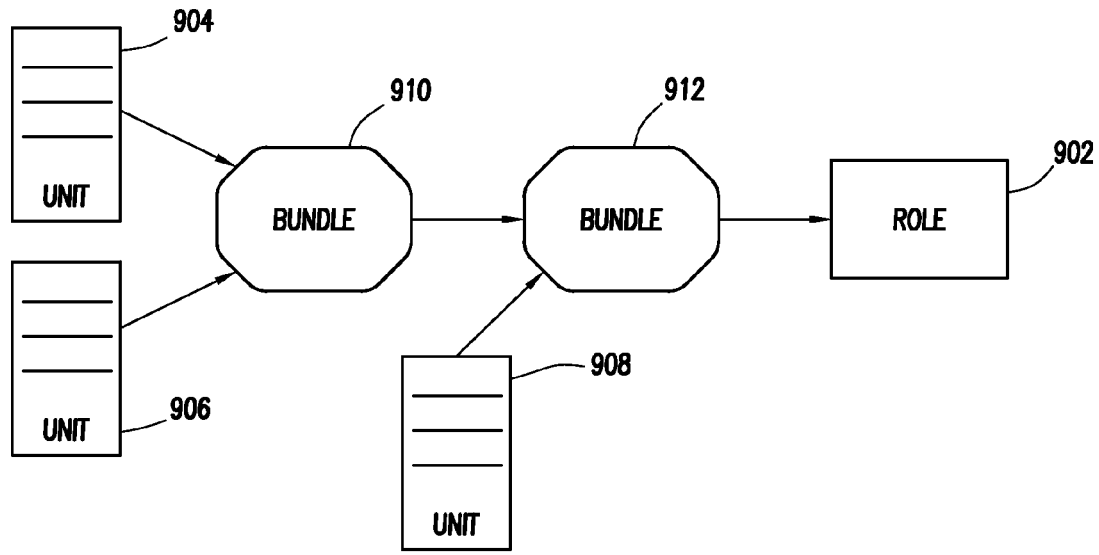
FIG. 9 is a block diagram illustrating the relationship between units, bundles, and roles, in accordance with one embodiment of the present invention.

FIG. 9 illustrates the hierarchy of individual software roles. Role 902 of FIG. 9 comprises a combination of software bundles and units. The software units 904, 906, 908 each comprise multiple software installation packages. One example of such software installation packages that may be contained within units 904, 906, 908 includes software bundles for the Linux OS, such as Redhat package manager (RPM) files. Such packages would be saved in a file having a name using the extension RPM, such as file_x.rpm.

Several units, such as units 904, 906, make up a bundle, 910. In addition, a bundle 912 may be made up of a combination of units, such as unit 908, and other bundles, such as bundle 910. These bundles are then combined into a role, such as role 902. This role 902 is stored as a list of packages, such as RPMs, to be installed on a device, and the order in which those packages are to be installed. These roles may, therefore, be used to rebuild a machine automatically, should a critical failure occur. Also, the role 902 illustrated in FIG. 9 may comprise a customer role package, such as the package 400 illustrated in FIG. 4, which contains three roles: the application role 402, the customer code role 404, and the OS role 406.

Figure 10:
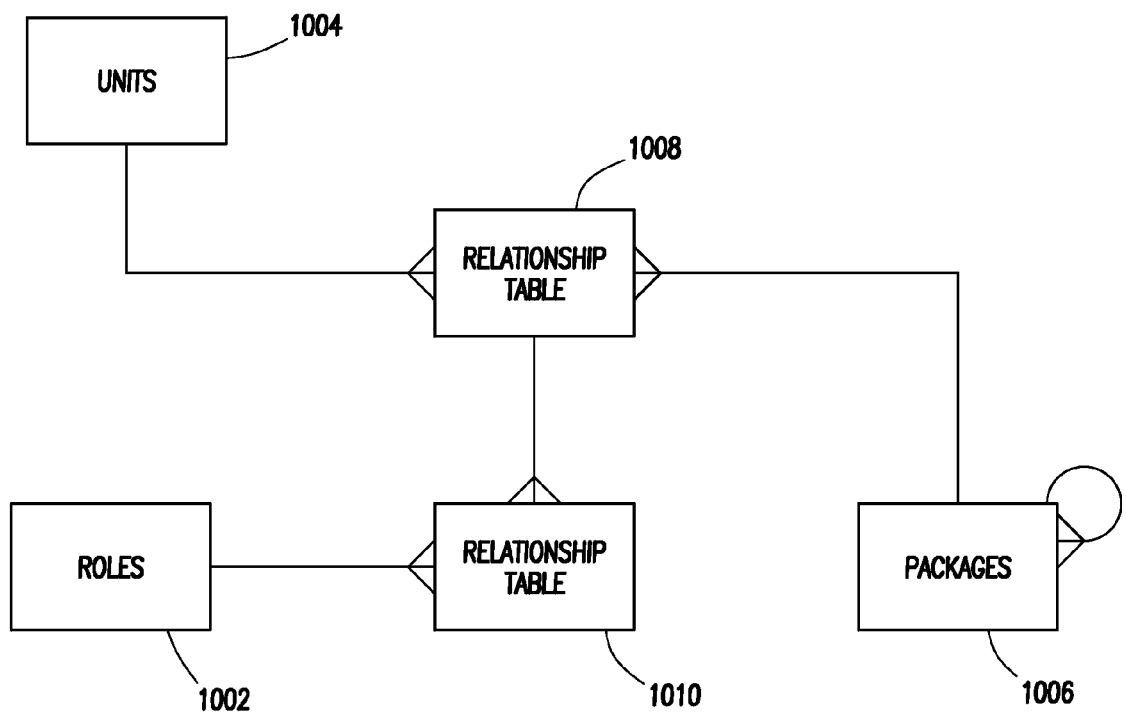
FIG. 10 is an entity relationship diagram illustrating the relationship between units, roles, and packages, in accordance with one embodiment of the present invention.

FIG. 10 illustrates the same relationships shown in FIG. 9 in the form of an entity relationship diagram. In FIG. 10, roles entities 1002 are related to units entities 1004 and packages entities 1006. These three groups of entities are related by way of two relationship tables 1008, 1010. The roles entities 1002 represent a role, such as role 902 of FIG. 9, or a group of roles. These roles entities 1002 are made up of multiple units entities 1004, which represent units, such as units 904, 906, 908 of FIG. 9. This is illustrated by the one-to-many relationship between the units entities 1004 and the relationship table 1008, which is related in a one-to-many relationship with the relationship table 1010. This relationship table 1010 is related to the roles entities 1002 in a many-to-one relationship. Thus, the roles represented by the roles entities 1002 may be made up of multiple units, which are represented by the units entities 1004. Additionally, the units represented by the units entities 1004 may be made up of multiple packages, such as the RPMs discussed above. These packages are represented by the packages entities 1006, which are related in a one-to-many relationship with the relationship table 1008 which is in turn related to the units entities 1004 in a many-to-one relationship. The packages 1006 are illustrated as having a one-to-many relationship with other packages, which indicates that any single package may contain multiple packages.

The relationship diagram illustrated in FIG. 10 is a particularly useful way to illustrate the relationship between the various components of a data model. As can be seen, much information can be gleaned from the entity relationship diagram of FIG. 10, and less space is required to express the same idea illustrated in FIG. 9. The entity relationship diagram also allows for convenient access to each aspect of the database being modeled for quick, accurate, and repeatable configuration of that database.

Figure 11:
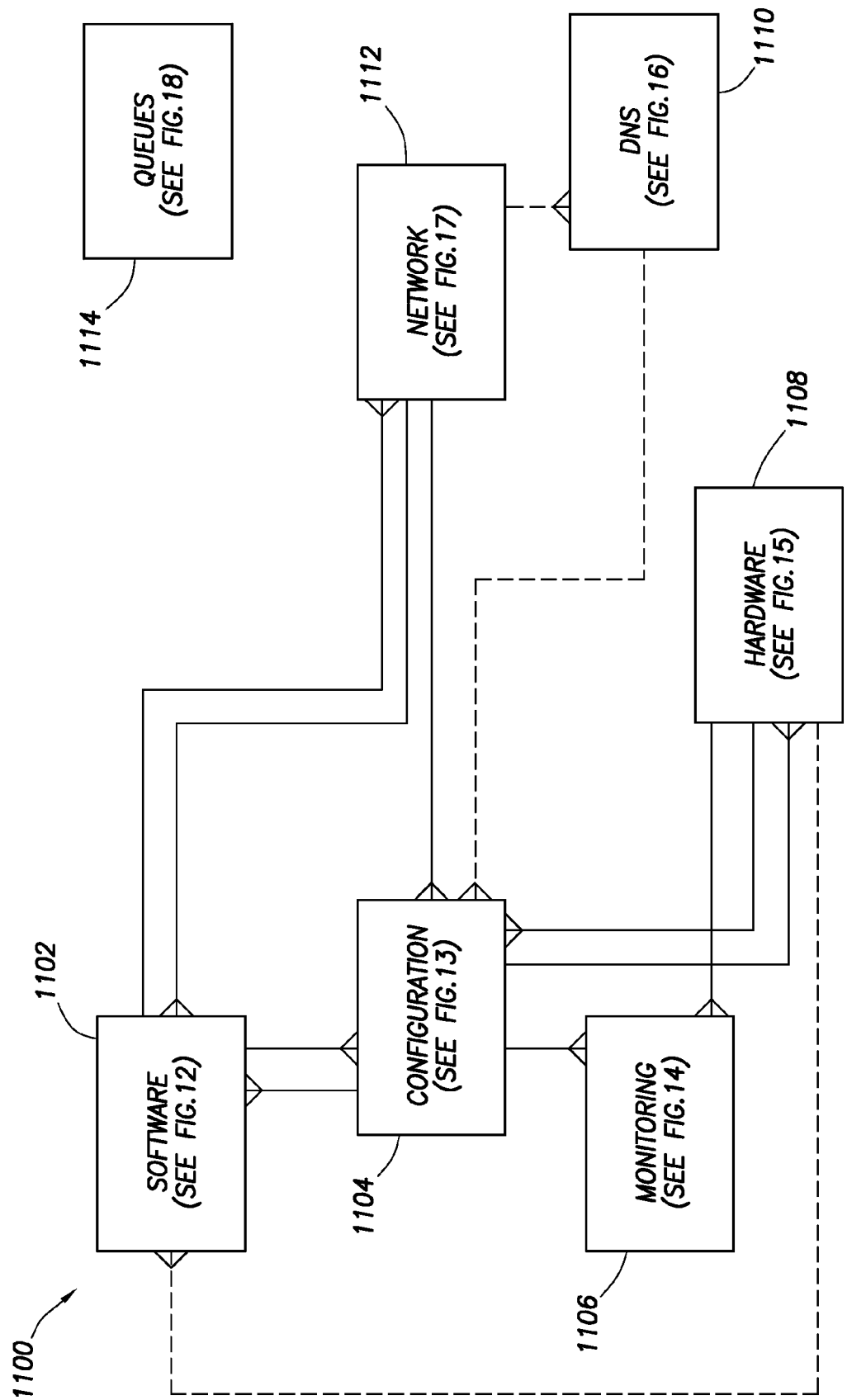
FIG. 11 is an entity relationship diagram illustrating the relationship between various aspects of the data model, in accordance with one embodiment of the present invention.

An entity relationship diagram of the data model according to one embodiment of the present invention is illustrated in FIG. 11. In FIG. 11, the data model 1100 is represented as having multiple entities related to one another. Each of these entities illustrated in FIG. 11 represents a group of entities and therefore FIG. 11 represents the data model on a macro level only. Each of the entities represented in the data model 1100 of FIG. 11 is broken into its components, and illustrated in more detail in subsequent figures, which are denoted in FIG. 11.

The data model 1100 in FIG. 11 relates the following entities: software 1102, configuration 1104, monitoring 1106, hardware 1108, DNS 1110, network 1112, and queues 1114. The software entities 1102 represent various software packages to be installed in devices, applications, and operating system software of the various network devices. The software entities 1102 are directly related to the configuration entities 1104, the hardware entities 1108, and the network entities 1112. As shown in FIG. 11, the software entities 1102 have an optional many-to-one relationship with the hardware entities 1108, and shares a combination of many-to-one and one-to-many relationships with both the configuration entities 1104 and the network entities 1112.

As described above, the configuration entities 1104 are related to the software entities 1102 with a many-to-one and one-to-many relationship, and similarly share a many-to-one and one-to-many relationships with the hardware entities 1108. Additionally, the configuration entities are related to the monitoring entities 1106 in a one-to-many relationship. The configuration entities 1104 relate to both the DNS entities 1110 and the network entities 1112 in a many-to-one relationship. The relationship with the DNS entities 1110 is optional, as indicated by the broken line connecting the configuration entities 1104 and the DNS entities 1110. These configuration entities 1104 represent the configuration of various network addresses, software packages, and device addresses.

The monitoring entities 1106 are related to the configuration entities 1104 as described above, and to the hardware entities 1108 in many-to-one relationships. The monitoring entities 1106 monitor the status and condition of entities within the configuration entities group 1104 and the hardware entities group 1108.

The hardware entities 1108 represent multiple hardware devices in communication with a network. These entities are related to the software entities 1102 in an optional one-to-many relationship, and as described above to the monitoring entities 1106 in a one-to-many relationship. Additionally, as described above, the hardware entities 1108 are related in both a many-to-one and one-to-many relationship with the configuration entities 1104.

The DNS entities 1110 represent all DNS transfers, queries, entries, configurations, and posts. They are optionally related to the configuration entities 1104 in a one-to-many relationship, and to the network entities 1112 in an optional many-to-one relationship.

The network entities 1112 are related to the software entities 1102 in a combination of many-to-one and one-to-many relationships, and to the configuration entities 1104 in a one-to-many relationship. Additionally, the network entities 1112 are optionally related to the DNS entities 1110 in a one-to-many relationship.

A group of entities called the queues entities 1114 are also illustrated in the database model 1100 of FIG. 11. However, the queues entities are not illustrated as having a direct relationship with any of the other entities of this model 1100. A relationship between the queues entities 1114 and the other entities within the data model 1100 is created by either business logic contained outside of the data model, or by intelligent agents, such as the agents 304A, 304B, 304C illustrated in FIG. 3. This type of relationship will be described hereinafter with greater detail.

FIGS. 12-18 illustrate in greater detail the entities of the data model 1100 illustrated in FIG. 11. In each of these figures, multiple entities that make up the entities represented in FIG. 11, will be shown as entity relationship diagrams. In this type of diagram, the one-to-many or many-to-one relationships between the entities will be illustrated in the same manner as in FIG. 11. Optional relationships will be illustrated by way of broken lines. Connections to entities within other groups of entities (i.e. written other entities of the data model 1100 in FIG. 11), will be indicated by lines at the edge of the page with a designation indicating the figure upon which those relationships are continued.

Each of the entities contained within FIGS. 12-18 have a set of variables associated with them, specific values of which characterize instances of each of the entities and their functionalities. These variables will be described hereinafter in tables. In these tables identifying variables associated with each entity, a variable name, variable definition, variable type, and an indication regarding whether the variable is required by the entity or optional to the entity will be given. Those skilled in the art will appreciate that the reference herein to "required" or "optional" with respect to the individual variables in each table is purely exemplary and that, in other exemplary embodiments which are not explicitly described herein, the status of these variables as "required" or "optional" may change. Additionally, an indication of the primary key of each entity of each variable set will be given by an asterisk immediately following the variable name. In some cases, multiple primary keys will be indicated. Generally, the primary key of a particular entity must be contained within each of the entities to which that entity relates and is the main variable associated with the entity. When the primary key of an entity is contained within another entity to which the first entity relates, it acts as a type of pointer, referring to the first entity.

Software 1102

Figure 12:
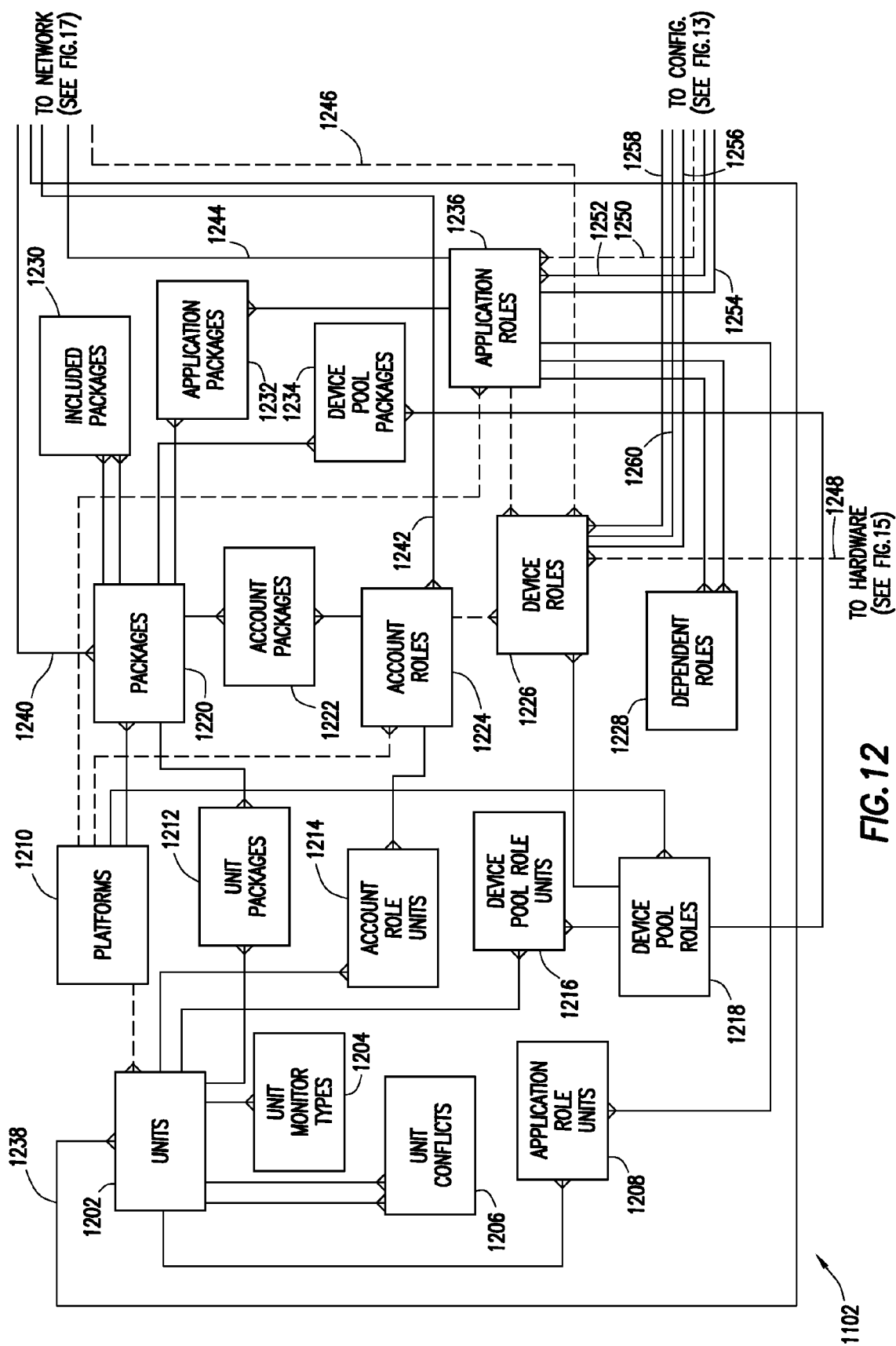
FIG. 12 is an entity relationship diagram illustrating the relationship between various entities relating to software within the data model of one embodiment of the present invention.

In FIG. 12, a detailed entity relationship diagram of the software entities 1102 is illustrated. Each of the entities within this diagram interrelate and are characterized by variable sets which provide enough specificity to accurately characterize the software portion of the network that the model is intended to capture. At the same time, however, these entities and their respective variables are sufficiently generic to readily permit the addition of, e.g., new software packages, without requiring the rewriting of software code which relies upon the model and the database implementation thereof.

Units Entities 1202

The units entities 1202 represent the software units described in connection with FIG. 10. The variable set associated with the units entities 1202 is set forth below in Table 1.

TABLE 1

VARIABLE SET OF UNITS ENTITIES 1202

| VARIABLE | VARIABLE DEFINITION | VARIABLE TYPE | REQUIRED/ OPTIONAL |
| --- | --- | --- | --- |
| UNIT_ID* | Unit identification number | Number | R |
| ACCT_ID | Account identification number | Number | R |
| PLATFORM_ID | Platform identification number | Number | O |
| UNIT_NAME | Unit name | Character | R |
| UNIT_TYPE | Unit type | Character | R |
| UNIT_VERSION | Unit version | Number | R |
| UNIT_DESC | Unit description | Character | O |
| UNIT_LOC | Unit location | Character | R |
| CREATED_BY | Created by | Character | R |
| CREATE_DT | Create date | Date | R |
| MODIFIED_BY | Modified by | Character | O |
| MODIFIED_DATE | Date modified | Date | O |
| INSTALL_FLAGS | Installation flags | Character | O |
| REMOVE_FLAGS | Remove flags | Character | O |

The units entities 1202 relate to unit monitor types entities 1204, unit contents entities 406, application role units 1208, unit packages entities 1212, account role units entities 1214, device pool role units entities 1216 and one-to-many relationships. The one-to-many relationship between the units entities 1202 and the unit conflicts entities 1206 includes dual one-to-many relationships. Also, the units entities 1202 may be related by the many-to-one relationship 1238 illustrated in FIG. 12 with entities within the network entities 1112 which is illustrated in detail in FIG. 17. Specifically, the units entities 1202 is related by this many-to-one relationship with the accounts entities 1702 of FIG. 17. An optional many-to-one relationship may exist between units entities 1202 and the platforms entities 1210.

Unit Monitor Types Entities 1204

The unit monitor types entities 1204 indicate the type of monitoring associated with the units related to the unit entities 1202. The variable set associated with the unit monitor types entities 1204 is set forth below in Table 2.

TABLE 2

VARIABLE SET OF MONITOR TYPES ENTITIES 1204

| VARIABLE | VARIABLE DEFINITION | VARIABLE TYPE | REQUIRED/ OPTIONAL |
| --- | --- | --- | --- |
| UNIT_ID* | Unit identification number | Number | R |
| MONITOR_TYPE | Monitor type | Character | R |
| MONITOR_NAME* | Monitor name | Character | R |
| START_LOC | Start location | Character | O |
| STOP_LOC | Stop location | Character | O |

As mentioned above, the unit monitor types entities 1204 relates to the units entities 1202 in a many-to-one relationship.

Unit Conflicts Entities 1206

The unit conflicts entities 1206 are used to identify any potential conflicts between units related to the units entities 1202. The variable set associated with the unit conflicts entities 1206 is set forth below in Table 3.

TABLE 3

VARIABLE SET OF UNIT CONFLICTS ENTITIES 1206

| VARIABLE | VARIABLE DEFINITION | VARIABLE TYPE | REQUIRED/ OPTIONAL |
| --- | --- | --- | --- |
| UNIT_ID | Unit indentification number | Number | R |
| CONFLICTING_UNIT_ID | Conflicting unit indentification number | Number | R |
| CONFLICT_DESC | Conflict description | Character | O |

As previously mentioned, the unit conflicts entities 1206 relate to the units entities 1202 in dual many-to-one relationships.

Application Role Units Entities 1208

The application role units entities 1208 relate application roles entities 1236 with units entities 1202, much in the same manner that roles are related to units in the relationships described in connection with FIG. 10. The variable set associated with the application role units entities 1208 is set forth below in Table 4.

TABLE 4

VARIABLE SET OF APPLICATION ROLE UNITS ENTITIES 1208

| VARIABLE | VARIABLE DEFINITION | VARIABLE TYPE | REQUIRED/ OPTIONAL |
| --- | --- | --- | --- |
| APP_ROLE_ID* | Application role indentification number | Number | R |
| UNIT_ID* | Unit identification number | Number | R |

TABLE 4-continued

VARIABLE SET OF APPLICATION ROLE UNITS ENTITIES 1208

| VARIABLE | VARIABLE DEFINITION | VARIABLE TYPE | REQUIRED/ OPTIONAL |
|---|---|---|---|
| INSTALL_ORDER | Installation order | Number | R |
| DATE_CREATED | Date control | Date | O |
| CREATED_BY | Created by | Character | O |

The application role units entities 1208 relate to the units entities 1202 in a many-to-one relationship, as discussed above. Additionally, the application role units entities 1208 relate to the application roles entities 1236 in a many-to-one relationship.

Platforms Entities 1210

Platforms entities 1210 indicate the platforms of the various computer devices connected to the network, upon which the units, packages, and roles run. The variable set associated with the platforms entities 1210 is set forth below in Table 5.

TABLE 5

VARIABLE SET OF PLATFORMS ENTITIES 1210

| VARIABLE | VARIABLE DEFINITION | VARIABLE TYPE | REQUIRED/ OPTIONAL |
|---|---|---|---|
| PLATFORM_ID* | Platform indentification number | Number | R |
| PLATFORM_NAME | Platform name | Character | R |
| PLATFORM-DESC | Platform description | Character | O |

The platforms entities 1210 may have multiple optional one-to-many relationships with other entities illustrated in FIG. 12. These entities with which the platforms entities 1210 may be related in an optional one-to-many relationship include the units entities 1202, as previously discussed, the account roles entities 1224, and the application roles entities 1236. Additionally, the platforms entities 1210 relates in a many-to-one fashion with the device pool roles entities 1218 and the packages entities 1220.

Unit Packages Entities 1212

The unit packages entities 1212 serve to relate the units represented by the units entities 1202 with the packages represented by the packages entities 1220, in much the same manner as described in connection with FIG. 10. The variable set associated with the unit packages entities 1212 is set forth below in Table 6.

TABLE 6

VARIABLE SET OF UNIT PACKAGES ENTITIES 1212

| VARIABLE | VARIABLE DEFINITION | VARIABLE TYPE | REQUIRED/ OPTIONAL |
|---|---|---|---|
| PKG_ID* | Package identification number | Number | R |
| UNIT_ID* | Unit identification number | Number | R |
| INSTALL_ORDER | Installation order | Number | R |
| EFF_BEG_DT* | Effective beginning date | Date | R |
| EFF_END_DT | Effective ending date | Date | O |

The unit package entities 1212 have many-to-one relationships with the units entities 1202, as previously discussed, and the packages entities 1220.

Account Role Units Entities 1214

Account role units entities 1214 are used in relating the units represented by the units entities 1202 with the account roles of the account roles entities 1224 in a similar manner as described in FIG. 10 using relational tables. The variable set associated with the account role units entities 1214 is set forth below in Table 7.

TABLE 7

VARIABLE SET OF ACCOUNT ROLE UNITS ENTITIES 1214

| VARIABLE | VARIABLE DEFINITION | VARIABLE TYPE | REQUIRED/ OPTIONAL |
|---|---|---|---|
| ACCT_ROLE_ID* | Account role indentification number | Number | R |
| UNIT_ID* | Unit identification number | Number | R |
| INSTALL_ORDER | Installation order | Number | R |
| DATE-CREATED | Date created | Date | R |
| CREATED_BY | Created by | Character | R |

The account role units entities 1214 have many-to-one relationships with the unit entities 1202, as previously indicated, and the account roles entities 1224.

Device Pool Role Units Entities 1216

The device pool role units entities 1216 serve to relate devices contained in device pools, which are associated with the device pool roles entities 1218, with the various software units associated with the units entities 1202 that are necessary to properly configure the devices. The variable set associated with the device pool role units entities 1216 is set forth below in Table 8.

TABLE 8

VARIABLE SET OF DEVICE POOL ROLE UNITS ENTITIES 1216

| VARIABLE | VARIABLE DEFINITION | VARIABLE TYPE | REQUIRED/ OPTIONAL |
|---|---|---|---|
| DEVICE_POOL ID* | Device pool indentification number | Number | R |
| UNIT_ID* | Unit identification number | Number | R |
| INSTALL_ORDER | Installation order | Number | R |
| DATE-CREATED | Date created | Date | O |
| CREATED_BY | Created by | Character | O |

The device pool role units 1216 have many-to-one relationships with the units entities 1202, as previously indicated, and the device pool roles entities 1218.

Device Pool Roles Entities 1218

Device pool poles entities 1218 relate the device pool packages, the device roles, and the platforms of the various devices with the device pool role units associated with the device pool role units entities 1216. The variable set associated with the device pool roles entities 1218 is set forth below in Table 9. These variables relate to the device pool role, or the software associated with a particular device pool. Thus, the variable STATUS, indicated below in Table 9, may indicate the status of a device role.

TABLE 9

VARIABLE SET OF DEVICE POOL ROLES ENTITIES 1218

| VARIABLE | VARIABLE DEFINITION | VARIABLE TYPE | REQUIRED/ OPTIONAL |
|---|---|---|---|
| DEVICE_POOL-ID* | Device pool indentification number | Number | R |
| PLATFORM_ID | Platform indentification number | Number | R |
| DEVICE_POOL_NAME | Device pool name | Character | R |
| STATUS | Device pool role status | Character | R |
| DEVICE_POOL_DESC | Device pool description | Character | O |
| DEVICE_POOL_ROLE_VERSION | Device pool role version | Number | R |
| EFF_BEG_DT | Effective beginning date | Date | R |
| CREATED_BY | Created by | Character | R |
| CREATE_DT | Date created | Date | R |
| VISIBLE | Visibility | Character | O |

The device pool roles entities 1218 are related to the device pool role units entities 1216 in a one-to-many relationship as previously discussed. Also, the device pool roles entities 1218 are related to the platforms entities 1210 in a many-to-one relationship, as previously discussed. In addition to these relationships, the device pool roles entities 1218 are related to the device roles entities 1226, and the device pool packages entities 1234 in one-to-many relationships.

Packages Entities 1220

The packages entities 1220 represent the various software packages, such as those described in connection with FIG. 10. The variable set associated with the packages entities 1220 is set forth below in Table 10.

TABLE 10

VARIABLE SET OF PACKAGES ENTITIES 1220

| VARIABLE | VARIABLE DEFINITION | VARIABLE TYPE | REQUIRED/ OPTIONAL |
|---|---|---|---|
| PKG_ID* | Package identification number | Number | R |
| PLATFORM_ID | Platform identification number | Number | R |
| ACCT_ID | Account identification number | Number | R |
| PKG_NAME | Package name | Character | R |
| PKG_TYPE | Package type | Character | R |
| PKG_VERSION | Package version | Number | R |
| PKG_DESC | Package description | Character | O |
| EFF_BEG_DT | Effective beginning date | Date | R |
| CREATED_BY | Created by | Character | R |
| CREATE_DT | Date created | Date | R |

The packages entities 1220 are related to the platforms entities 1210 in a many-to-one relationship, and the unit packages entities 1212 in a one-to-many relationship, as discussed above. Additionally, the packages entities 1220 is related to the account packages of entities 1222, the included packages entities 1230, the application packages entities 1232, and the device pool packages 1234 in one-to-many relationships. The relationship between the packages entities 1220 and the included packages entities 1230 is a dual one-to-many relationship. Also, the packages entities 1220 are related by way of the many-to-one relationship 1240 to an entity within the network entities 1112 shown in FIG. 17. Specifically, the packages entities 1220 relates to the accounts entities 1702 of FIG. 17 by way of a many-to-one relationship 1214.

Account Packages Entities 1222

The account packages entities 1222 serves to relate the packages entities 1220 with the account roles entities 1224, in a manner similar to the manner in which packages are related to roles in FIG. 10. The variable set associated with the account packages entities 1222 is set forth below in Table 11.

TABLE 11

VARIABLE SET OF ACCOUNT PACKAGES ENTITIES 1222

| VARIABLE | VARIABLE DEFINITION | VARIABLE TYPE | REQUIRED/ OPTIONAL |
|---|---|---|---|
| ACCT_ROLE_ID* | Account role indentification number | Number | R |
| PKG_ID* | Package identification number | Number | R |
| INSTALL_ORDER | Installation order | Number | R |
| EFF_BEG_DT* | Effective beginning date | Date | R |
| EFF_END_DT | Effective ending date | Date | O |

The account packages entities 1222 relate to the packages entities 1220 as previously described, and the account roles entities 1224 in many-to-one relationships.

Account Roles Entities 1224

The account roles entities 1224 represent the various software roles associated with particular customer accounts. The variable set associated with the account roles entities 1224 is set forth below in Table 12. These variables relate to the account roles, or software packages for each account. For example, the STATUS variable may indicate the status of an account role as active, inactive, deprecated, experimental, and so forth.

| VARIABLE | VARIABLE DEFINITION | VARIABLE TYPE | REQUIRED/ OPTIONAL |
|---|---|---|---|
| ACCT_ROLE_ID* | Account role identification number | Number | R |
| ACCT_ID | Account identification number | Number | R |
| ACCT_ROLE_NAME | Account role name | Character | R |
| STATUS | Account role status | Character | R |

TABLE 12

VARIABLE SET OF ACCOUNT ROLES ENTITIES 1224

| VARIABLE | VARIABLE DEFINITION | VARIABLE TYPE | REQUIRED/ OPTIONAL |
|---|---|---|---|
| ACCT_ROLE_VERSION | Account role version | Number | R |
| ACCT_ROLE_DESC | Account role description | Character | O |

TABLE 12-continued

VARIABLE SET OF ACCOUNT ROLES ENTITIES 1224

| VARIABLE | VARIABLE DEFINITION | VARIABLE TYPE | REQUIRED/ OPTIONAL |
|---|---|---|---|
| EFF_BEG_DT | Effective beginning date | Date | R |
| CREATED_BY | Created by | Character | R |
| CREATE_DT | Date created | Date | R |
| PLATFORM_ID | Platform identification number | Number | O |

As previously mentioned, the account roles entities 1224 relates in one-to-many relationships with the account role units entities 1214 and the account packages entities 1222. Also, as previously described, the account roles entities 1224 may optionally relate to the platforms entities 1210 in a many-to-one relationship. The account roles entities 1224 may also optionally relate to the device roles entities 1226 in a one-to-many relationship. The account roles entities 1224 may also relate, by way of a many-to-one relationship 1242, to an entity within the network entities 1112 illustrated in FIG. 17. Specifically, the account roles entities 1224 relates to the account entities 1702 illustrated in FIG. 17 by way of a many-to-one relationship 1242.

Device Roles Entities 1226

The device roles entities 1226 represent the various software roles associated with each device connected to the network. The variable set associated with the device roles entities 1226 is set forth below in Table 13.

TABLE 13

VARIABLE SET OF DEVICE ROLES ENTITIES 1226

| VARIABLE | VARIABLE DEFINITION | VARIABLE TYPE | REQUIRED/ OPTIONAL |
|---|---|---|---|
| DVC_ID | Device identification number | Number | O |
| DVC_ROLE_ID* | Device role identification number | Number | R |
| CUST_TIER_ID | Customer tier identification number | Number | O |
| DEVICE_POOL_ID | Device pool identification number | Number | R |
| ACCT_ROLE_ID | Account role identification number | Number | O |
| APP_ROLE_ID | Application role identification number | Number | O |
| DVC_ROLE_NAME | Device role name | Character | R |
| STATUS | Device role status | Character | R |
| EFF_BEG_DT | Effective beginning date | Date | R |
| CREATED_BY | Created by | Character | R |
| CREATE_DT | Date created | Date | R |

As mentioned before, the device roles entities 1226 relate to the device pool roles entities 1218, and optionally to the account roles entities 1224 in many-to-one relationships. The device roles entities also has optional many-to-one relationships with the application roles entities 1236, the customer tiers entities 1708 of FIG. 17 by way of relationship 1246, and the devices entities 1512 of FIG. 15 by way of relationship 1248. The device roles entities 1226 also relates in dual one-to-many and a single many-to-one relationship with elements of the configuration entities 1104 illustrated in FIG. 13. Specifically, the device roles entities 1226 relate to the device role configuration entities 1320 of FIG. 13 and the device role IP host entities 1308 of FIG. 13 in one-to-many relationships 1256, 1260, respectively. The device roles entities 1226 also relates to the status entities 1322 of FIG. 13 by a many-to-one relationship 1258.

Dependent Roles Entities 1228

The dependent roles entities 1228 relate to the application roles represented by the application roles entities 1236. The dependent roles entities 1228 serve to identify various application roles that are dependent upon other roles, and to describe this dependency. The variable set associated with the dependent roles entities 1228 is set forth below in Table 14.

TABLE 14

VARIABLE SET OF DEPENDENT ROLES ENTITIES 1228

| VARIABLE | VARIABLE DEFINITION | VARIABLE TYPE | REQUIRED/ OPTIONAL |
|---|---|---|---|
| APP_ROLE_ID | Application role identification number | Number | R |
| DEPENDENT_UPON_ROLE_ID | Dependent upon role number | Number | R |
| DEPENDENCY_DESC | Description of dependency | Character | R |

The dependent roles entities relate in dual many-to-one relationships with the application roles entities 1236.

Included Packages Entities 1230

The included packages entities 1230 is related to the packages entities 1220 and identifies packages that are included within a particular installation package, and the order in which it is to be installed. The variable set associated with the included packages entities 1230 is set forth below in Table 15.

TABLE 15

VARIABLE SET OF INCLUDED PACKAGES ENTITIES 1230

| VARIABLE | VARIABLE DEFINITION | VARIABLE TYPE | REQUIRED/ OPTIONAL |
|---|---|---|---|
| PKG_ID* | Package identification number | Number | R |
| INCLUDED_PKG_ID* | Included package identification number | Number | R |
| INSTALL_ORDER | Installation order | Number | R |
| EFF_BEG_DT | Effective beginning date | Date | R |
| EFF_END_DT | Effective ending date | Date | O |

The included packages 1230 are related to the packages entities 1220 in dual many-to-one relationships, as described above.

Application Packages Entities 1232

The application packages entities 1232 relates the packages represented by the packages entities 1220 and the application roles represented by the application roles entities 1236. The relationship of the roles in packages is similar to the manner in which the roles in packages are related in FIG. 10. The variable set associated with the application packages entities 1232 is set forth below in Table 16.

TABLE 16

VARIABLE SET OF APPLICATION PACKAGES ENTITIES 1232

| VARIABLE | VARIABLE DEFINITION | VARIABLE TYPE | REQUIRED/ OPTIONAL |
|---|---|---|---|
| APP_ROLE_ID* | Application role identification number | Number | R |
| PKG_ID* | Package identification number | Number | R |
| INSTALL_ORDER | Installation order | Number | R |
| EFF_BEG_DT | Effective beginning date | Date | R |
| EFF_END_DT | Effective ending date | Date | O |

The application packages entities 1232 relate to the packages entities 1220 as previously described, and the application roles entities 1236 in many-to-one relationships.

Device Pool Packages Entities 1234

The device pool packages entities 1234 serve to relate the device pool roles represented by the device pool roles entities 1218 with the packages represented by the packages entities 1220. This occurs in a similar manner as described in connection with FIG. 10. The variable set associated with the device pool packages entities 1234 is set forth below in Table 17.

TABLE 17

VARIABLE SET OF DEVICE POOL PACKAGES ENTITIES 1234

| VARIABLE | VARIABLE DEFINITION | VARIABLE TYPE | REQUIRED/ OPTIONAL |
|---|---|---|---|
| DEVICE_POOL_ID* | Device pool identification number | Number | R |
| PKG_ID* | Package identification number | Number | R |
| INSTALL_ORDER | Installation order | Number | R |
| EFF_BEG_DT | Effective beginning date | Date | R |
| EFF_END_DT | Effective ending date | Date | O |

The device pool packages entities 1234 relate to the packages entities 1220 on the device pool roles entities 1218 in many-to-one relationships, as described above.

Application Roles Entities 1236

The application roles entities 1236 represent the various application software roles. The variable set associated with the application roles entities 1236 is set forth below in Table 18. These variables relate to the application role. For example, the STATUS variable may give an indicator that an application role is active, inactive, experimental, deprecated, supported, unsupported, and so forth.

TABLE 18

VARIABLE SET OF APPLICATION ROLES ENTITIES 1236

| VARIABLE | VARIABLE DEFINITION | VARIABLE TYPE | REQUIRED/ OPTIONAL |
|---|---|---|---|
| APP_ROLE_ID* | Application role identification number | Number | R |
| ROLE_NAME | Role name | Character | R |
| ROLE_DESC | Role description | Character | R |
| APP_ROLE_VERSION | Application role version | Number | R |
| EFF_BEG_DT | Effective beginning date | Date | R |
| STATUS | Application role status | Character | R |
| CREATED_BY | Created by | Character | R |
| CREATE_DT | Date created | Date | R |
| PLATFORM_ID | Platform identification number | Number | O |
| SRVC_ID | Service identification number | Number | O |

As previously described, the application roles entities 1236 relates in a one-to-many relationship with the application role units entities 1208, the application packages entities 1232, and optionally the device roles entities 1226. Additionally, the application roles entities 1236, as indicated above, relates to the dependent roles entities 1228 in dual one-to-many relationships. The application roles entities 1236 also optionally relates in a many-to-one relationship with the platforms entities 1210. In addition to these relationships previously described, the application roles entities 1236 relates in a one-to-many relationship 1244 with the data center tiers 1724 of FIG. 7. The application roles entities 1236 also relates in a one-to-many relationship 1254 with the role configurations entities 1316 of FIG. 13. The application roles entities 1236 also relates to the status entities 1322 of FIG. 13, and optionally to the services entities 1314 of FIG. 13 by way of many-to-one relationships 1252, 1250, respectively.

Figure 15:
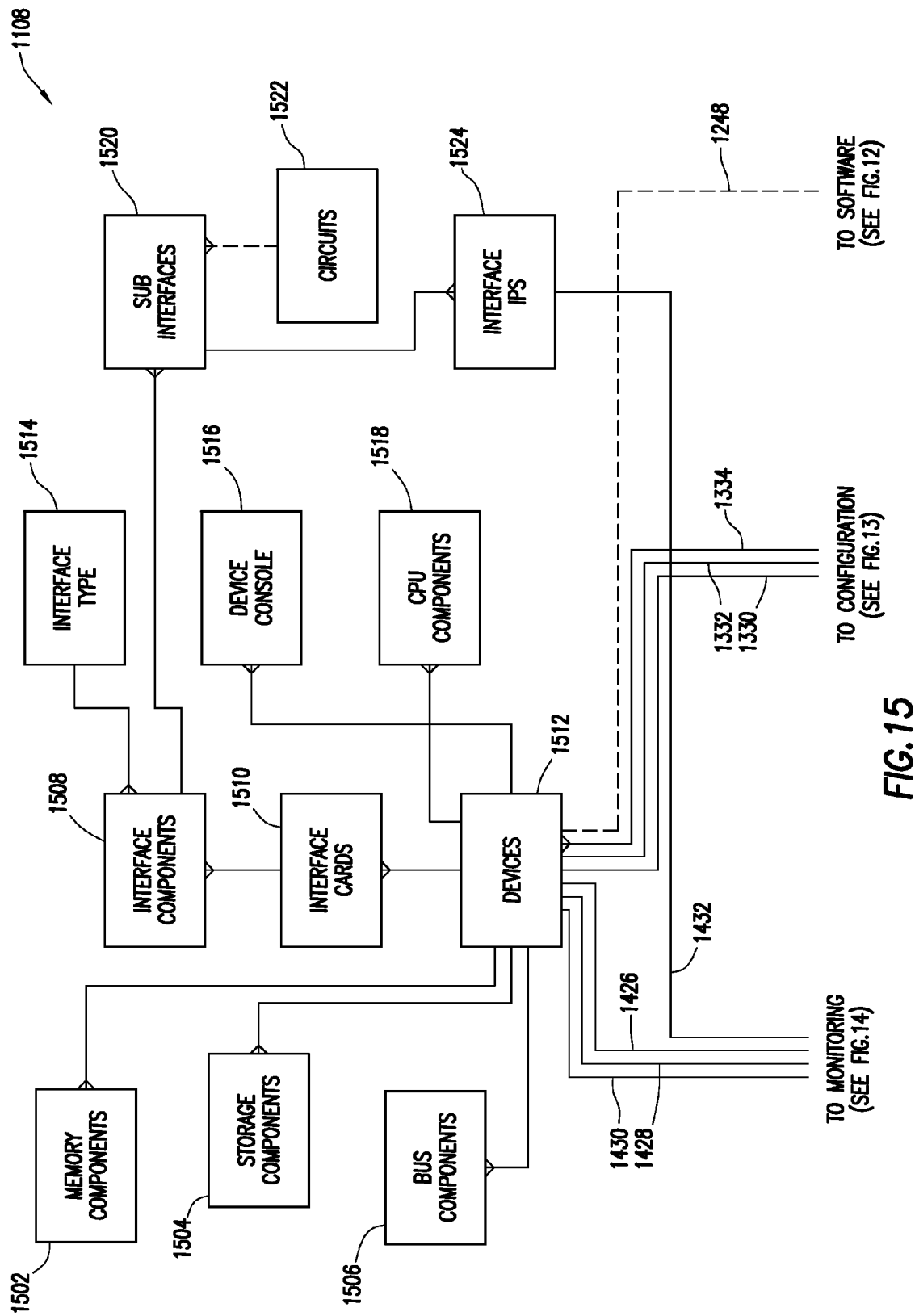
FIG. 15 is an entity relationship diagram illustrating the relationship between various entities relating to hardware within the data model of one embodiment of the present invention.
Figure 17:
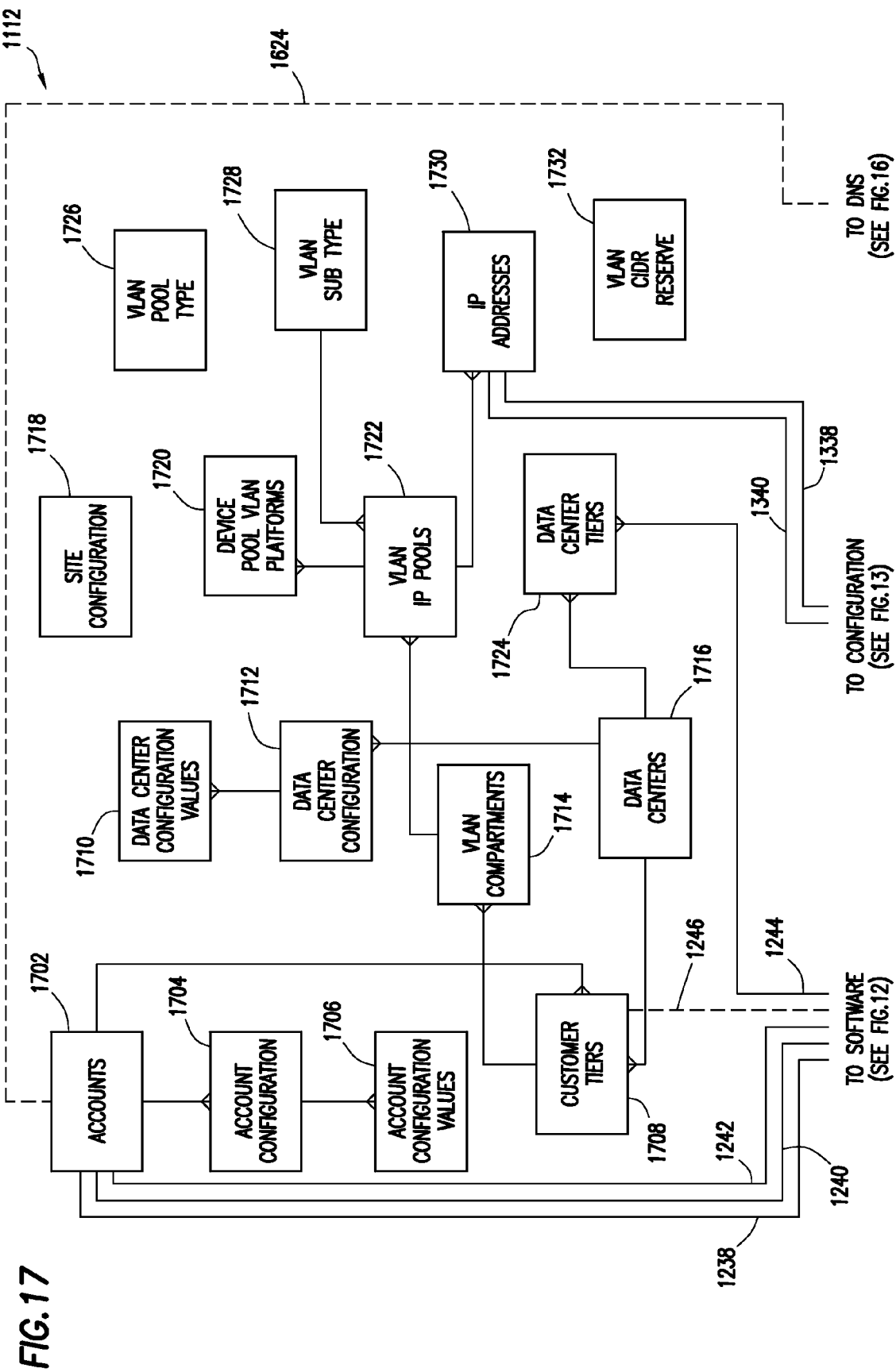
FIG. 17 is an entity relationship diagram illustrating the relationship between various entities relating to network within the data model of one embodiment of the present invention.

Multiple entities within the software entities 1102 relate to entities illustrated in various other figures. For example, the relationships 1238, 1240, 1242, 1244, 1246 relate to various entities within the network entities 1112, which is illustrated in FIG. 17. These relationships have been labeled in FIG. 17 to indicate the direct relationship between entities of the software entities 1102 in FIG. 12 and the network entities 1112 in FIG. 17. Additionally, an optional relationship 1248 with the hardware entities 1108, which is illustrated in FIG. 15, is also indicated. Further, the relationships 1250, 1252, 1254, 1256, 1258 relate to entities within the configuration entities 1104, which is illustrated in FIG. 13.

Configuration 1104

Figure 13:
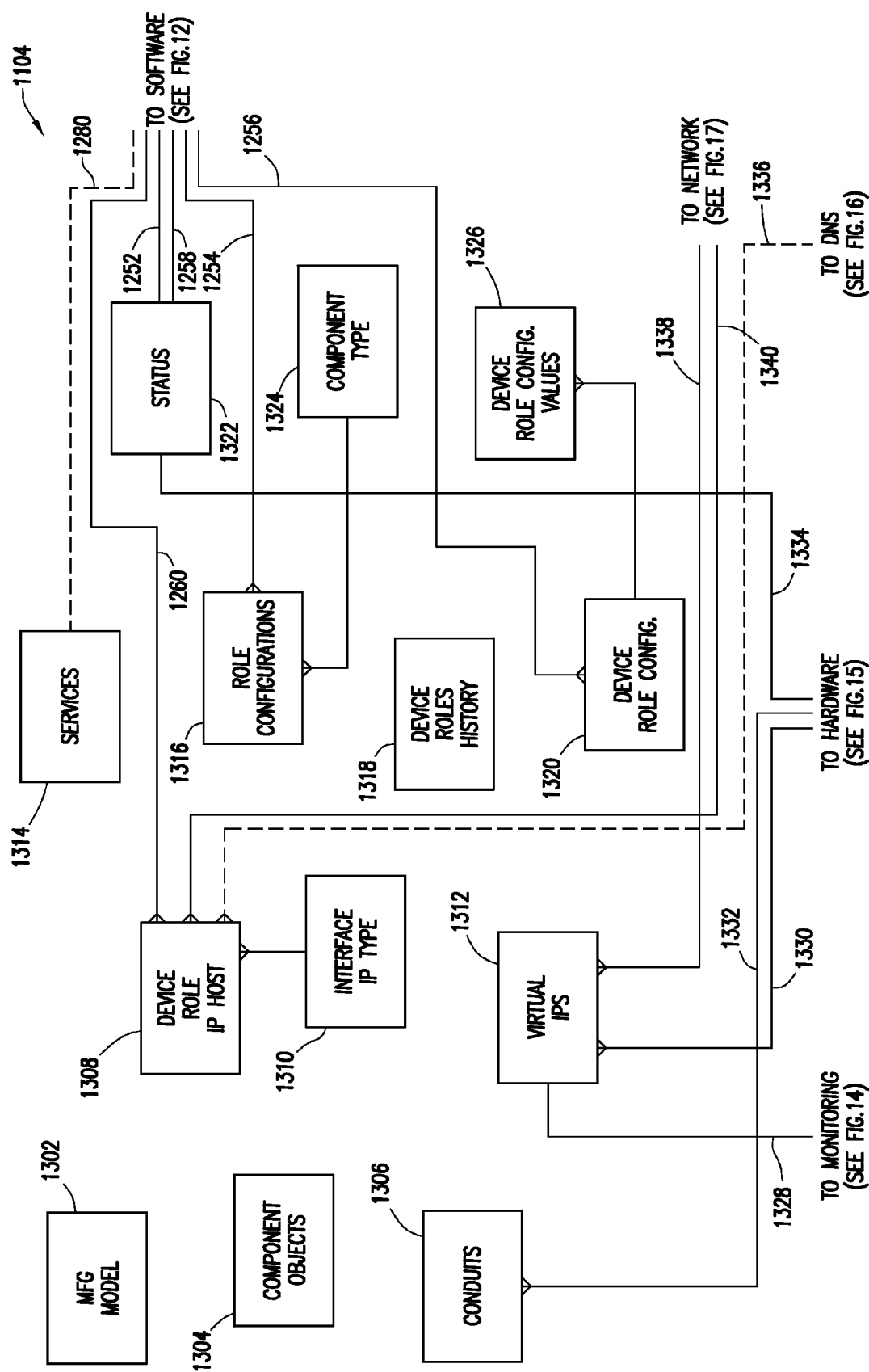
FIG. 13 is an entity relationship diagram illustrating the relationship between various entities relating to configuration within the data model of one embodiment of the present invention.

The entities of the configuration entities 1104 are illustrated in FIG. 13. These configuration entities 1104 represent various configuration information relating to software, hardware, the network, and the like. Those entities which are not illustrated as having a direct relationship with any of the other entities are used by business logic, or intelligent agents, for various purposes. Like the software entities from FIG. 12, each of the entities within this diagram interrelate and are characterized by variable sets which provide enough specificity to accurately characterize the software portion of the network that the model is intended to capture. At the same time, however, these entities and their respective variables are sufficiently generic to readily permit the addition of, e.g., new configurations, without requiring the rewriting of software code which uses the model and the database implementation thereof.

Manufacturing Model Entities 1302

The manufacturing model entities 1302 is used to identify a manufacturing model identification number, manufacturing name, model name, and manufacturing model description. For example, if a Sun Spore 5 server is used by the present invention, the manufacturer name would be Sun, and the model name would be Spore 5. The description could be any indication that it is a server. The variable set associated with the manufacturing model entities 1302 is set forth below in Table 19.

TABLE 19

VARIABLE SET OF MANUFACTURING MODEL ENTITIES 1302

| VARIABLE | VARIABLE DEFINITION | VARIABLE TYPE | REQUIRED/ OPTIONAL |
| --- | --- | --- | --- |
| MFG_MODEL_ID* | Manufacturing model identification number | Number | R |
| MFG | Manufacturing name | Character | R |
| MODEL | Model name | Character | R |
| MFG_MODEL_DESC | Manufacturing model description | Character | O |

The manufacturing model entities 1302 does not directly relate to any of the other entities illustrated in FIG. 13. This group of entities 1302 is used by business logic associated with the present invention to determine manufacturer name, model name, and manufacturer description for each of the devices used on the network associated with the present invention.

Component Objects Entities 1304

The component objects entities 1304 provide an indication of what table a particular value is stored in. For example, a location of the table in which values relating to the specific hardware or software object may be obtained by way of the component object entities 1304. The variable set associated with the component objects entities 1304 is set forth below in Table 20.

TABLE 20

VARIABLE SET OF COMPONENT OBJECTS ENTITIES 1304

| VARIABLE | VARIABLE DEFINITION | VARIABLE TYPE | REQUIRED/ OPTIONAL |
| --- | --- | --- | --- |
| TABLE_NAME* | Table name | Character | R |
| ID_NAME | Identification name | Character | R |
| SEQUENCE_NAME | Sequence name | Character | O |
| FATHER_ID_NAME | Father identification name | Character | O |
| AUTOGENERATE_ID | Autogenerate identification | Character | R |

The component objects entities 1304 does not directly relate to any of the entities illustrated in FIG. 13. This group of entities 1304 is used by business logic associated with the present invention to determine which tables should be used to look up values relating to specific objects on the network associated with the present invention. The objects whose values may be found by way of the component objects entities 1304 may be hardware objects or software objects.

Conduits Entities 1306

The conduits entities 1306 relate to the devices of the network associated with the present invention. These conduits entities 1306 relate to conduits by which information may be passed through a firewall. In essence, the conduits through a firewall constitute holes through a firewall by which devices may communicate from outside of the firewall to devices contained within the firewall. Thus, the conduits entities 1306 define the source and destination addresses that involved in communications across the firewall. The present invention also maintains a history, which records all of the traffic across the firewall. The variable set associated with the conduits entities 1306 is set forth below in Table 21.

TABLE 21

VARIABLE SET OF CONDUITS ENTITIES 1306

| VARIABLE | VARIABLE DEFINITION | VARIABLE TYPE | REQUIRED/ OPTIONAL |
| --- | --- | --- | --- |
| DVC_ID* | Device identification number | Number | R |
| SOURCE* | Source | Character | R |
| DESTINATION* | Destination | Character | R |
| PORT | Port | Number | O |
| PROTOCOL | Protocol | Character | R |
| CONDUIT_DESC | Conduit description | Character | O |

The conduits entities 1306 relate to the devices entities 1512 of FIG. 15 in a many-to-one relationship 1332.

Device Role IP Host Entities 1308

The device role IP host entities 1308 act a place holder for the various devices of the network, and allow IP addresses to be assigned without having a specific device connected to the network. The IP addresses of the devices used on the network associated with the present invention may be of a physical type or a logical type. This means that the IP address may physically relate to the specific device connected to the network, or may be a logical IP address, which does not correspond to the actual physical IP address, but relates the same device. The variable set associated with the device role IP host entities 1308 is set forth below in Table 22.

TABLE 22

VARIABLE SET OF DEVICE ROLE IP HOST ENTITIES 1308

| VARIABLE | VARIABLE DEFINITION | VARIABLE TYPE | REQUIRED/ OPTIONAL |
| --- | --- | --- | --- |
| DVC_ROLE_ID | Device role identification number | Number | R |
| IP_ADDRESS* | IP address | Character | R |
| INTERFACE_SLOT | Interface slot | Character | O |
| INTERFACE_IP_TYPE | Interface IP type | Character | R |
| HOST_NAME | Host name | Character | O |
| DNS_HOST-ID | DNS Host identification number | Number | O |
| EFF_END_DT | Effective ending date | Date | O |
| EFF_BEG_DT | Effective beginning date | Date | R |

The device role IP host entities 1308 relates to the interface IP type entities 1310 in a many-to-one relationship. Also, as previously discussed, the device role IP host entities 1308 relates to the device roles entities 1226 of FIG. 12 in a many-to-one relationship 1260. The device role IP host also relates in a many-to-one relationship 1340 to the IP addresses entities 1730 of FIG. 17. The device role IP host entities 1308 may optionally relate to the DNS hosts entities 1604 of FIG. 16 in a many-to-one relationship 1336.

Interface IP Type Entities 1310

The interface IP type entities 1310 indicate the type of interface associated with each IP address. The variable set associated with the interface IP type entities 1310 is set forth below in Table 23.

TABLE 23

VARIABLE SET OF INTERFACE IP TYPE ENTITIES 1310

| VARIABLE | VARIABLE DEFINITION | VARIABLE TYPE | REQUIRED/ OPTIONAL |
| --- | --- | --- | --- |
| INTERFACE IP_TYPE* | Interface IP type | Character | R |
| INTERFACE_IP_TYPE-DESC | Interface IP type description | Character | R |

The interface IP type entities 1310 is related to the device role IP host entities 1308 in a one-to-many relationship.

Virtual IPs Entities 1312

The virtual IPs entities 1312 relate to virtual IP addresses, which allow for virtual IP addressing, and allow for multiple machines to have the same IP address, or group of addresses mapped to them by way of a load balancer. A variable called STICKY may be set to require that each time a specific device accesses an IP address it is mapped to the same server by the load balancer. This "sticky" routing allows cookies to be used that were placed on the device by that server. The variable set associated with the virtual IPs entities 1312 is set forth below in Table 24.

TABLE 24

VARIABLE SET OF VIRTUAL IPS ENTITIES 1312

| VARIABLE | VARIABLE DEFINITION | VARIABLE TYPE | REQUIRED/ OPTIONAL |
| --- | --- | --- | --- |
| DVC_ID | Device identification number | Number | R |
| IP_ADDRESS* | IP address | Character | R |
| STICKY | Sticky routing | Character | R |
| ALGORITHM_TYPE | Algorithm type | Character | O |

Figure 14:
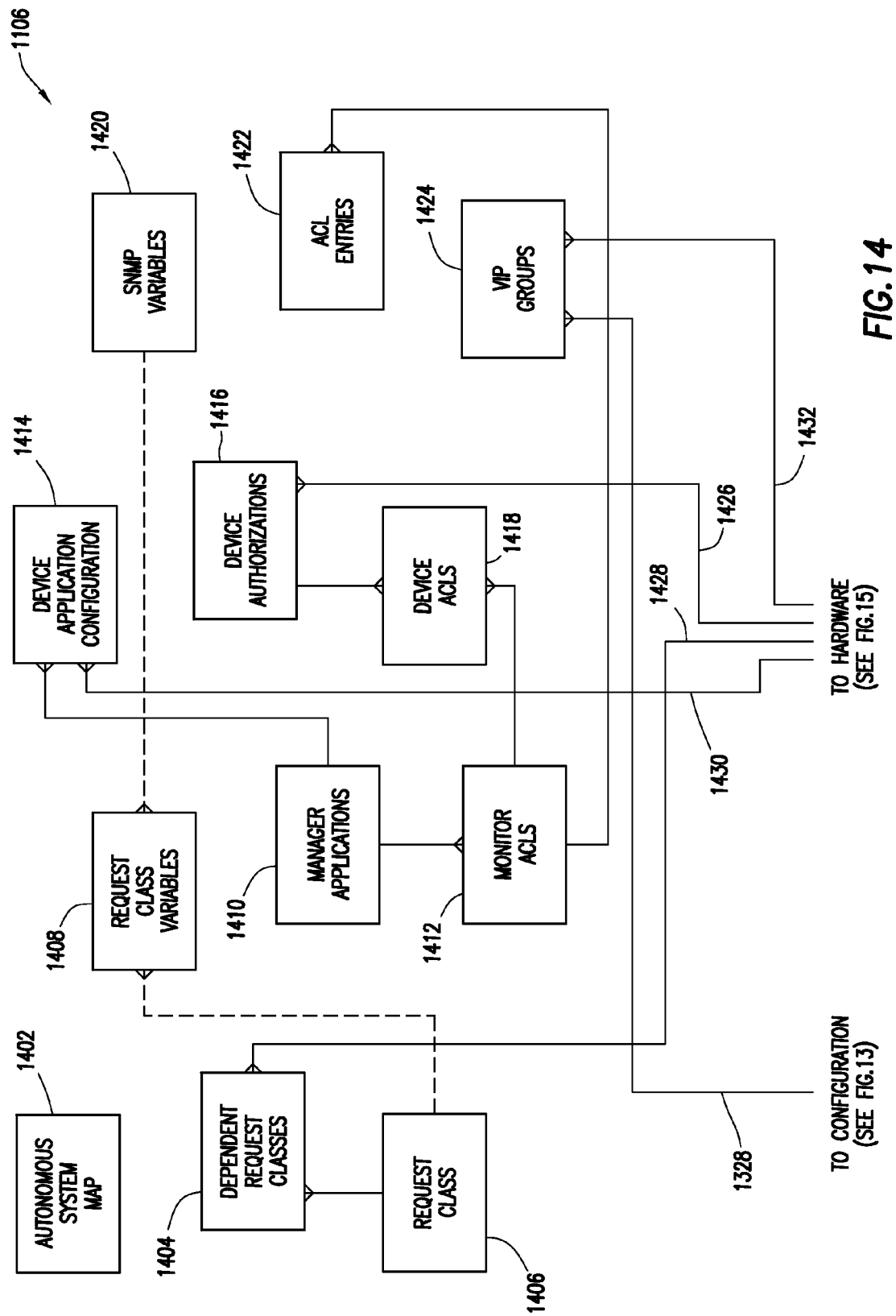
FIG. 14 is an entity relationship diagram illustrating the relationship between various entities relating to monitoring within the data model of one embodiment of the present invention.

The virtual IPs entities 1312 relates to the VIP groups entities 1424 of FIG. 14 in a one-to-many relationship 1328, the devices entities 1512 of FIG. 15 in a many-to-one relationship 1330, and to the IP addresses entities 1730 of FIG. 17 in a many-to-one relationship 1338.

Services Entities 1314

The services entities 1314 relate application roles to services for the convenience of users and network customers. This allows a customer to view and configure application roles in terms of services offered, which is a useful quality to customers. The variable set associated with the services entities 1314 is set forth below in Table 25.

TABLE 25

VARIABLE SET OF SERVICES ENTITIES 1314

| VARIABLE | VARIABLE DEFINITION | VARIABLE TYPE | REQUIRED/ OPTIONAL |
| --- | --- | --- | --- |
| SRVC_ID* | Service identification number | Number | R |
| SRVC_NAME | Service name | Character | R |
| SRVC_DESC | Service description | Character | O |

The services entities 1314 may optionally relate to the application roles entities 1236 of FIG. 12 in a one-to-many relationship 1250, as discussed above.

Role Configurations Entities 1316

The role configurations entities 1316 relate to the actual configurations of software roles. These role configuration associated with the configurations entities 1316 may include such information as the types of components to be used, such as specific memory types, CPU types, video card types. Also, the quantity of components to be used may be indicated, along with the component size and type. For example, if an Intel processor is used as a CPU, the quantity may be designated as two or three, and so on depending upon the number of the processor occupied by a particular customer. The component size associated with such a CPU would be expressed in megahertz, indicating the processing scheme. The configuration type would be expressed in a brand name, or perhaps a minimum specification requirement. The variable set associated with the role configurations entities 1316 is set forth below in Table 26.

TABLE 26

VARIABLE SET OF ROLE CONFIGURATIONS ENTITIES 1316

| VARIABLE | VARIABLE DEFINITION | VARIABLE TYPE | REQUIRED/ OPTIONAL |
| --- | --- | --- | --- |
| APP_ROLE_ID* | Application role identification number | Number | R |
| COMPNT_TYPE* | Component type | Character | R |
| QUANTITY | Quantity | Number | R |
| COMPNT_SIZE | Component size | Character | O |
| CONFIG_TYPE | Configuration type | Character | R |

The role configuration entities 1316 relate to the component type entities 1324 in a many-to-one relationship, and, as previously discussed, the application roles entities 1236 of FIG. 12 in a many-to-one relationship 1254.

Device Roles History Entities 1318

The device roles history entities 1318 is a history of all roles executed by a particular device. That is, the history of all software that has ever been employed by a specific device is indicated in the device roles history entities 1318. Thus, many of the entries within the device roles history entries 1318 are similar to those of the device roles entities 1226. The variable set associated with the device roles history entities 1318 is set forth below in Table 27.

TABLE 27

VARIABLE SET OF DEVICE ROLES HISTORY ENTITIES 1318

| VARIABLE | VARIABLE DEFINITION | VARIABLE TYPE | REQUIRED/ OPTIONAL |
|---|---|---|---|
| DVC ROLE_ID | Device role identification number | Number | O |
| CUST_TIER_ID | Customer tier identification number | Number | O |
| DEVICE_POOL_ID | Device pool identification number | Number | O |
| ACCT_ROLE_ID | Account role identification number | Number | O |
| APP_ROLE_ID | Application role identification number | Number | O |
| DVC_ROLE_PRO-FILE_ID | Device role profile identification number | Number | O |
| DVC_ROLE_NAME | Device role name | Character | O |
| DVC_ROLE BEG_DT | Device role beginning date | Date | R |
| DVC_ROLE END_DT | Device role ending date | Date | R |

The device roles history entities 1318 cannot relate directly to any other entities illustrated on FIG. 13. The information contained within these entities 1318 is used by business logic associated with the present invention. The type of operation that may be performed by business logic using the device roles history entities 1318 may include, for example, a software rollback when software contained on a particular device has failed.

Device Role Configuration Entities 1320

The device role configuration entities 1320 relate to the configuration of various software roles. These device role configuration entities 1320 are a way in which generic name-value pairs may be defined, which are associated with device roles of the present invention. One instance in which this might be used is if a particular device has four processors, but a particular customer is only paid to use two processors of that server, a name-value pair may be used to indicate these specific device role configurations. Thus, a generic keyname may be generated associated with the two processors that have been paid for by a customer. The values associated with the name-value pair for which the name is expressed in the device role configuration entities 1320 is expressed within the device role configuration values entities 1326. The variable set associated with the device role configuration entities 1320 is set forth below in Table 28.

TABLE 28

VARIABLE SET OF DEVICE ROLE CONFIGURATION ENTITIES 1320

| VARIABLE | VARIABLE DEFINITION | VARIABLE TYPE | REQUIRED/ OPTIONAL |
|---|---|---|---|
| DVC_ROLE_ID | Device role identification number | Number | R |
| KEY_NAME | Key name | Character | R |
| DVC_ROLE_CON- | Device role | Number | R |

TABLE 28-continued

VARIABLE SET OF DEVICE ROLE CONFIGURATION ENTITIES 1320

| VARIABLE | VARIABLE DEFINITION | VARIABLE TYPE | REQUIRED/ OPTIONAL |
|---|---|---|---|
| FIG_ID* | configuration identification number | | |

The device role configuration entities 1320 is related to a device role configuration values entities 1326 in a one-to-many relationship, and to the device roles entities 1226 of FIG. 12 in a many-to-one relationship 1256.

Status Entities 1322

The status entities 1322 provide status reports regarding various software and hardware configurations. The variable set of the status entities 1322 is set forth below in Table 29.

TABLE 29

VARIABLE SET OF STATUS ENTITIES 1322

| VARIABLE | VARIABLE DEFINITION | VARIABLE TYPE | REQUIRED/ OPTIONAL |
|---|---|---|---|
| STATUS* | Status | Character | R |
| STATUS_DESC | Status description | Character | R |

The status entities 1322 relate to the application roles entities 1236, and the device roles entities 1226, both of FIG. 12, in one-to-many relationships 1252, 1258, respectively. Also, the status entities 1322 relate to the devices entities 1512 of FIG. 15 in a one-to-many relationship 1324.

Component Type Entities 1324

The component type entities 1324 is related to the various types of components associated with the devices of the network. The variable set associated with the component type entities 1324 is set forth below in Table 30.

TABLE 30

VARIABLE SET OF COMPONENT TYPE ENTITIES 1324

| VARIABLE | VARIABLE DEFINITION | VARIABLE TYPE | REQUIRED/ OPTIONAL |
|---|---|---|---|
| COMPNT_TYPE* | Component type | Character | R |
| COMPNT_TYPE_DESC | Component type description | Character | R |

The component type entities 1324 relate to the role configurations entities 1316 in a one-to-many relationship.

Device Role Configuration Values Entities 1326

The device role configuration values entities 1326 relate to values associated with the role configurations, which are represented by the device role configuration entities 1320. The device role configuration values 1326 are the value portion of the main-value pair associated with the device roles, for which the names are expressed within the device role configuration entities 1320, as previously described. The variable set associated with the device role configuration values entities 1326 is set forth below in Table 31.

TABLE 31

VARIABLE SET OF DEVICE ROLE CONFIGURATION VALUES ENTITIES 1326

| VARIABLE | VARIABLE DEFINITION | VARIABLE TYPE | REQUIRED/ OPTIONAL |
|---|---|---|---|
| DVC_ROLE_CONFIG_ID* | Device role configuration identification number | Number | R |
| CONFIG_VALUE | Configuration value | Character | R |
| TEXT_ORDER* | Text order | Number | R |

The device role configuration values entities 1326 relate to the device role configuration entities 1320 in a many-to-one relationship.

As discussed in connection with FIG. 12, the various entities within the configuration entities 1104 of FIG. 13 are related to entities within the software entities 1102 of FIG. 12. The relationships 1250, 1252, 1254, 1256, 1258, 1260 are indicated as continuing on FIG. 12. Additionally, relationship 1328 is continued on FIG. 14, relationships 1330, 1332, 1334 are continued on FIG. 15, optional relationship 1336 may be continued on FIG. 16, and relationships 1338, 1340 are continued on FIG. 17. Each of these relationships is designated with the same numeral in the figure in which it continues, and illustrates the entity with which it relates directly.

Monitoring 1106

The entities of the monitoring entities 1106 are illustrated in FIG. 14 and an entity relationship diagram form. These entities relate to components that maintain the network and various hardware and software components of the networks, as well as configuration information. As with the aforementioned entities, the monitoring entities are described in terms of specific interrelations and are characterized by variable sets which provide enough specificity to accurately characterize the software portion of the network that the model is intended to capture. At the same time, however, these entities and their respective variables are sufficiently generic to readily permit the addition of, e.g., new monitoring functions, without requiring the rewriting of software code which relies upon the model and the database implementation thereof.

Autonomous System Map Entities 1402

The autonomous system map entities are used to create an autonomous system map of the entire system associated with the present invention. The variable set associated with the autonomous system map entities 1402 is set forth below in Table 32.

TABLE 32

VARIABLE SET OF AUTONOMOUS SYSTEM MAP ENTITIES 1402

| VARIABLE | VARIABLE DEFINITION | VARIABLE TYPE | REQUIRED/ OPTIONAL |
|---|---|---|---|
| AS_MAP_ID* | Autonomous system map identification number | Number | R |
| AS_NUM | Autonomous system number | Number | O |
| AS_DESCRIPTOR | Autonomous system description | Character | O |
| AS_NAME | Autonomous system name | Character | O |
| CREATE_DT | Date created | Date | R |
| CREATED_BY | Created by | Character | R |
| MODIFIED_DT | Date modified | Date | O |
| MODIFIED_BY | Modified by | Character | O |

The autonomous system map entities 1402 of the monitoring entities 1106 illustrated in FIG. 14 are not directly related to any other entities of FIG. 14. However, the information contained within the autonomous system map entities 1402 is used by business logic and intelligent agents network in ascertaining system map information regarding the network of the present invention.

Device Request Classes Entities 1404

The device request classes entities 1404 are used to relate device classes, and requests associated with those devices. The device classes associated with the device request classes entities may include a particular group of devices, such as load balancers, routers, or servers. The variable set associated with the device request classes entities 1404 is set forth below in Table 33.

TABLE 33

VARIABLE SET OF DEVICE REQUEST CLASSES ENTITIES 1404

| VARIABLE | VARIABLE DEFINITION | VARIABLE TYPE | REQUIRED/ OPTIONAL |
|---|---|---|---|
| DVC_ID* | Device identification number | Number | R |
| REQUEST_CLASS_ID* | Request class identification number | Number | R |
| POLL_FREQUENCY | Poll frequency of class | Number | R |

The device request classes entities 1404 are related in a many-to-one relationship with the request class entities 1406. The device request classes entities portion of four are related in a many-to-one relationship 1428 with the devices entities 1512 of FIG. 15.

Request Class Entities 1406

The request class entities 1406 may be optionally related to request class variables entities 1408. The request class entities 1406 define suitable names for device classes used in connection with the present invention. The variable set associated with the request class entities 1406 is set forth below in Table 34.

TABLE 34

VARIABLE SET OF REQUEST CLASS ENTITIES 1406

| VARIABLE | VARIABLE DEFINITION | VARIABLE TYPE | REQUIRED/ OPTIONAL |
|---|---|---|---|
| REQUEST_CLASS_ID* | Request class identification number | Number | R |
| REQUEST_CLASS_NAME | Request class name | Character | R |

The request class entities 1406 may be optionally related to the request class variables entities 1408 in a one-to-many relationship.

Request Class Variables Entities 1408

The request class variables entities 1408 act as a relationship table between the request class entities 1406 and the SNMP variable entities 1420. The request class variables entities identify all variables collected for specific request class, and identify a foreign key to the request class table which relates the request classes to SNMP variables within the SNMP variable entities 1420. The variable set associated with the request class variables entities 1408 is set forth below in Table 35.

TABLE 35

VARIABLE SET OF REQUEST VARIABLES ENTITIES 1408

| VARIABLE | VARIABLE DEFINITION | VARIABLE TYPE | REQUIRED/ OPTIONAL |
|---|---|---|---|
| REQUEST_ CLASS_VAR_ID* | Request class variable identification number | Number | R |
| REQUEST_ CLASS-ID | Request class identification number | Number | O |
| SNMP_VAR_ID | SNMP variable identification number | Number | O |

The request class variables entities 1408 may be optionally related in many-to-one relationships with the request class entities 1406, as discussed above, and to the SNMP variables entities 1420.

Manager Applications Entities 1410

The manager applications entities 1410 is a list of internal applications that defines all applications allowed to communicate with devices and access these devices, such as software applications. The variable set associated with the manager applications entities 1410 is set forth below in Table 36.

TABLE 36

VARIABLE SET OF MANAGER APPLICATIONS ENTITIES 1410

| VARIABLE | VARIABLE DEFINITION | VARIABLE TYPE | REQUIRED/ OPTIONAL |
|---|---|---|---|
| MGR_APP_ID* | Manager application identification number | Number | R |
| APP_NAME | Application name | Character | R |
| CREATE_DT | Dated created | Date | R |
| MODIFIED_DT | Date modified | Date | O |
| MODIFIED_BY | Modified by | Character | O |

The manager applications entities 1410 are related to the monitor ACLs entities 1412 and the device application configuration entities 1414.

Monitor ACLs Entities 1412

The monitor ACLs entities 1412 allows for monitoring of access control list (ACLs) associated with devices of the present invention. The variable set associated with the monitor ACLs entities 1412 is set forth below in Table 37.

TABLE 37

VARIABLE SET OF MONITOR ACLS ENTITIES 1412

| VARIABLE | VARIABLE DEFINITION | VARIABLE TYPE | REQUIRED/ OPTIONAL |
|---|---|---|---|
| MON_ACL_ID* | Monitor ACL identification number | Number | R |
| MGR_APP_ID | Monitor application identification number | Number | R |
| SET_NAME | Set name | Character | O |

TABLE 37-continued

VARIABLE SET OF MONITOR ACLS ENTITIES 1412

| VARIABLE | VARIABLE DEFINITION | VARIABLE TYPE | REQUIRED/ OPTIONAL |
|---|---|---|---|
| SET_NUM | Set number | Number | O |
| CREATE_DT | Date created | Date | O |
| MODIFIED_DT | Date modified | Date | O |
| MODIFIED_BY | Modified by | Character | O |

The monitor ACLs entities 1412 are related to the manager applications entities 1410 in a many-to-one relationship, as discussed above. The monitor ACLs entities 1412 are also related to the device ACLs entities 1418 and the ACL entries entities 1422 in one-to-many relationships.

Device Application Configuration Entities 1414

The device application configuration entities 1414 relate devices with manager applications, and provide a mechanism whereby the configuration of device applications may be monitored. The device application configuration entities 1414 are a name-value pair for device applications configured on the network. A date or text value may be entered and associated with the devices, depending upon the specific device type. The variable set associated with the device application configuration entities 1414 is shown below in Table 38.

TABLE 38

VARIABLE SET OF DEVICE APPLICATION CONFIGURATION ENTITIES 1414

| VARIABLE | VARIABLE DEFINITION | VARIABLE TYPE | REQUIRED/ OPTIONAL |
|---|---|---|---|
| DVC_ID* | Device identification number | Number | R |
| MGR_APP_ID* | Manager application identification number | Number | R |
| CREATE_DT | Date created | Date | R |
| CONFIG_TXT_VAL | Configuration text value | Character | O |
| CONFIG_DT_VAL | Configuration date value | Date | O |
| CONFIG_NAME* | Configuration name | Character | R |
| CREATED_BY | Created by | Character | R |

The device application configuration entities is related in many-to-one relationships with the manager applications entities 1410, as previously discussed, and with the devices entities 1512 of FIG. 15 by way of relationship 1430.

Device Authorization Entities 1416

The device authorization entities 1416 are used for authorizing use of devices by way of user names, passwords, and the like. The device authorization entities 1416 describe specific device authorizations required by the simple network management protocol (SNMP), used in connection with one embodiment of the present invention. The device authorization entities 1416 allow for current and future, or next values, of user names and passwords to be read, written, and trapped (having an alert sent regarding an erroneous user name or password). The variable set associated with the device authorization entities 1416 is set forth below in Table 39.

TABLE 39

VARIABLE SET OF DEVICE AUTHORIZATION ENTITIES 1416

| VARIABLE | VARIABLE DEFINITION | VARIABLE TYPE | REQUIRED/ OPTIONAL |
|---|---|---|---|
| DVC_AUTH_ID* | Device authorization identification number | Number | R |
| DVC_ID | Device identification number | Number | R |
| MGR_APP_ID | Manager Application identification number | Number | R |
| USERNAME | User name | Character | O |
| VIEW_PASSWD | View password | Character | O |
| ENABLE PASSWD | Enable password | Character | O |
| CURR_V1_READ | Read current value | Character | O |
| CURR_V1_WRITE | Write current value | Character | O |
| CURR_V1_TRAP | Send alert for current value | Character | O |
| NEXT_V1_READ | Read next value | Character | O |
| NEXT_V1_WRITE | Write next value | Character | O |
| NEXT_V1_TRAP | Send alert for next value | Character | O |
| CREATE_DT | Date created | Date | O |
| MODIFIED_DT | Date modified | Date | O |
| MODIFIED_BY | Modified by | Character | O |

The device authorization entities 1416 relate to the device ACLs entities 1418 in a one-to-many relationship and to the devices entities 1512 of FIG. 15 in a many-to-one relationship 1426.

Device ACLs Entities 1418

The device ACLs entities 1418 are used to provide the device authorizations entities 1416 with the correct access control lists (ACLs). The variable set associated with the device ACLs entities 1418 is set forth below in Table 40.

TABLE 40

VARIABLE SET OF DEVICE ACLS ENTITIES 1418

| VARIABLE | VARIABLE DEFINITION | VARIABLE TYPE | REQUIRED/ OPTIONAL |
|---|---|---|---|
| MON_ACL_ID* | Monitor ACL identification number | Number | R |
| DVC_AUTH_ID* | Device Authorization identification number | Number | R |
| MODIFIED_DT | Date modified | Date | O |
| MODIFIED_BY | Modified by | Character | O |

The device ACLs entities 1418 are related to the monitor ACLs entities 1412 and the device authorizations entities 1416 in many-to-one relationships, as previously discussed.

SNMP Variables Entities 1420

The SNMP variables entities 1420 provide information regarding variables associated with the simple network management protocol (SNMP) associated with the devices connected to the network of the present invention. Generally, standard SNMP variables are assigned to specific devices or objects and a unique object identification must be determined for internal purposes. The variable set associated with the SNMP variables entities 1420 is set forth below in Table 41.

TABLE 41

VARIABLE SET OF SNMP VARIABLES ENTITIES 1420

| VARIABLE | VARIABLE DEFINITION | VARIABLE TYPE | REQUIRED/ OPTIONAL |
|---|---|---|---|
| SNMP_VAR_ID* | SNMP Variable Identification Number | Number | R |
| DOTTED_OID | | Character | R |
| VAR_NAME | Variable name Identification Number | Character | R |

The SNMP variables entities 1420 may optionally be related to the request class variables entities 1408 in a one-to-many relationship.

ACL Entries Entities 1422

The ACL entries entities 1422 relate to the entries on the access control lists associated with the various devices connected to the network of the present invention. The variable set associated with the ACL entries entities 1422 is set forth below in Table 42.

TABLE 42

VARIABLE SET OF ACL ENTRIES ENTITIES 1422

| VARIABLE | VARIABLE DEFINITION | VARIABLE TYPE | REQUIRED/ OPTIONAL |
|---|---|---|---|
| MON_ACL_ID* | Monitor ACL identification number | Number | R |
| PERMISSION* | Permission | Character | R |
| IP_ADDRESS* | IP Address | Character | R |
| NET MASK | Net Mask Name | Character | O |
| TCPIP_PORT | TCP/IP | Character | O |

ACL entries entities 1422 is related in a many-to-one relationship with the monitor ACLs entities 1412.

VIP Groups Entities 1424

The Virtual IP (VIP) groups entities 1424 relate to devices grouped into VIP groups. The VIP groups entities 1424 are used by load balancers within the system to route single IP addresses to multiple servers by way of VIP mapping. An interface identification number is provided, and an interface port may be specified. The variable set associated with the VIP groups entities 1424 is shown below in Table 43.

TABLE 43

VARIABLE SET OF GROUPS ENTITIES 1424

| VARIABLE | VARIABLE DEFINITION | VARIABLE TYPE | REQUIRED/ OPTIONAL |
|---|---|---|---|
| VIP_GROUP_ID* | VIP group Identification Number | Number | R |
| VIP_ID_ADDRESS | VIP IP address | Character | R |
| GROUP_NAME | Group name | Character | O |
| VIP_PORT | VIP port | Character | O |
| IF_IP_ID | Interface IP Identification number | Number | R |
| IF_PORT | Interface port | Character | O |

The VIP groups entities 1424 are related to the virtual IPs entities 1312 of FIG. 13 in a many-to-one relationship 1428, and to the interface IPs entities 1524 of FIG. 15.

Various relationships 1426, 1428, 1430, 1432 in FIG. 14 are indicated as relating entities within the monitoring entities 1106, with entities illustrated on FIG. 15, associated with the hardware entities 1108. Additionally, as discussed in connection with FIG. 13, the relationship 1328 from FIG. 13 relates to the VIP groups elements 1424, as shown in FIG. 14.

Hardware 1108

The entities illustrated in FIG. 15 are part of the hardware entities 1108, and are illustrated in entity relationship diagram form. Each of these entities is described below. Each of the entities within this diagram interrelate and are characterized by variable sets which provide enough specificity to accurately characterize the hardware portion of the network that the model is intended to capture. At the same time, however, these entities and their respective variables are sufficiently generic to readily permit the addition of, e.g., new hardware devices, without requiring the rewriting of software code which relies upon the model and the database implementation thereof and permitting the reuse of existing software code to interact with the database model regarding the newly added hardware device.

Memory Components Entities 1502

The memory components entities 1502 describe various memory components of the devices related to the device entities 1512. The variable set associated with the memory components entities 1502 is set forth below in Table 44.

TABLE 44

VARIABLE SET OF MEMORY COMPONENTS ENTITIES 1502

| VARIABLE | VARIABLE DEFINITION | VARIABLE TYPE | REQUIRED/ OPTIONAL |
|---|---|---|---|
| DVC_ID | Device Identification Number | Number | R |
| MEM_COMPT_ID* | Memory Component Identification Number | Number | R |
| QUANTITY | Quantity of memory components | Character | R |
| MEM_TYPE | Memory type | Character | R |
| MEM_LOCATION | Memory location | Character | O |
| EFF_BEG_DT | Effective beginning date | Date | R |
| EFF_END_DT | Effective ending date | Date | O |

The memory components entities 1502 relates to the devices entities 1512 in a many-to-one relationship.

Storage Components Entities 1504

The storage components entities 1504 relate to the storage components of devices associated with the devices entities 1512. The variable set associated with the storage components entities 1504 is set forth below in Table 45.

TABLE 45

VARIABLE SET OF STORAGE COMPONENTS ENTITIES 1504

| VARIABLE | VARIABLE DEFINITION | VARIABLE TYPE | REQUIRED/ OPTIONAL |
|---|---|---|---|
| DVC_ID | Device | Number | R |
| STOR_COMPNT_ID* | Storage Component identification number | Number | R |
| STOR_MEDIA | Storage media | Character | R |
| STOR_TYPE | Storage type | Character | R |
| STOR_MFG | Storage Manufacturer | Character | O |
| STOR_MODEL | Storage model | Character | O |
| STOR_CAP | Storage capacity | Character | O |

TABLE 45-continued

VARIABLE SET OF STORAGE COMPONENTS ENTITIES 1504

| VARIABLE | VARIABLE DEFINITION | VARIABLE TYPE | REQUIRED/ OPTIONAL |
|---|---|---|---|
| STOR_DRIVE | Storage drive | Character | R |
| EFF_BEG_DT | Effective beginning date | Date | R |
| EFF_END_DT | Effective ending date | Date | O |

The storage components entities 1504 relate to the devices entities 1512 in a many-to-one relationship.

Bus Components Entities 1506

The bus components entities 1506 are related to the bus components of the devices represented by the devices entities 1512. The variable set associated with the bus components entities 1506 is set forth below in Table 46.

TABLE 46

VARIABLE SET OF BUS COMPONENTS ENTITIES 1596

| VARIABLE | VARIABLE DEFINITION | VARIABLE TYPE | REQUIRED/ OPTIONAL |
|---|---|---|---|
| DVC_ID | Device identification number | Number | R |
| BUS_COMPNT_ID* | Bus component identification number | Number | R |
| BUS_TYPE | Bus type | Character | R |
| BUS_DVC_ID | Bus device identification | Character | O |
| BUS_DVC_VENDOR | Bus device vendor | Character | O |
| BUS_DVC_CLASS | Bus device class | Character | O |
| BUS_DVC_VERSION | Bus device version | Character | O |
| BUS_ID | Bus identification | Character | R |
| EFF_BEG_DT | Effective beginning date | Date | R |
| EFF_END_DT | Effective ending date | Date | O |

The bus components entities 1506 relate to the devices entities 1512 in a many-to-one relationship.

Interface Components Entities 1508

The interface components entities 1508 relate to interface components contained within interface cards of the devices represented by the devices entities 1512. The variable set associated with the interface components entities 1508 is set forth below in Table 47.

TABLE 47

VARIABLE SET OF COMPONENTS ENTITIES 1508

| VARIABLE | VARIABLE DEFINITION | VARIABLE TYPE | REQUIRED/ OPTIONAL |
|---|---|---|---|
| IF_CARD_ID | Interface card identification number | Number | R |
| IF_COMPNT_ID* | Interface component identification number | Number | R |
| IF_TYPE | Interface type | Character | R |
| HW_ADDR | Hardware address | Character | O |
| IF_SPEED | Interface speed | Character | O |

TABLE 47-continued

VARIABLE SET OF COMPONENTS ENTITIES 1508

| VARIABLE | VARIABLE DEFINITION | VARIABLE TYPE | REQUIRED/ OPTIONAL |
|---|---|---|---|
| EFF_BEG_DT | Effective beginning date | Date | R |
| EFF_END_DT | Effective ending date | Date | O |
| IF_ALIAS | Interface alias | Character | O |
| IF_DESC | Interface descriptor | Character | O |
| IF_INDEX | Interface index | Number | O |

The interface components entities 1508 relate to the interface cards entities 1510 and the interface type entities 1514 in many-to-one relationships. Also, the interface components interface 1508 relate to the subinterfaces entities 1520 in a one-to-many relationship.

Interface Cards Entities 1510

The interface cards entities 1510 relate to the interface cards contained within the devices represented by the devices entities 1512. The variable set associated with the interface cards entities 1510 is set forth below in Table 48.

TABLE 48

VARIABLE SET OF INTERFACE CARDS ENTITIES 1510

| VARIABLE | VARIABLE DEFINITION | VARIABLE TYPE | REQUIRED/ OPTIONAL |
|---|---|---|---|
| DVC_ID | Device identification number | Number | R |
| IF_CARD_ID* | Interface card identification number | Number | R |
| CARD_IND | Card index number | Number | O |
| CARD_SER_NUM | Card serial number | Number | O |
| SLOT | Slot | Character | O |
| CPU_SPEED | CPU processing speed | Character | O |
| MEM_QUANT | Memory quantity | Character | O |
| EFF_BEG_DT | Effective beginning date | Date | R |
| DRAM_MB | Amount of DRAM in MB | Number | O |
| CONTAINED_BY | Contained by | Number | O |

The interface cards entities 1510 relate to the devices entities 1512 in a many-to-one relationship.

Devices Entities 1512

The devices entities 1512 relate to the various devices connected to the network associated with the present invention. Multiple variables are for defining devices and communication with the network associated with the present invention. For example, information such as device and manufacturer identifications, serial numbers, device types, status, and other similar descriptions are provided for, along with other convenient variables, such as a flag which indicates whether a device should be monitored or not. The MONITOR_FLG variable may be used in the future to determine the level of monitoring that should be performed for each device identified within the device's entities 1512. The variable set associated with the devices entities 1512 is set forth below in Table 49.

TABLE 49

VARIABLE SET OF DEVICES ENTITIES 1512

| VARIABLE | VARIABLE DEFINITION | VARIABLE TYPE | REQUIRED/ OPTIONAL |
|---|---|---|---|
| DVC_ID* | Device identification number | Number | R |
| MID | Manufacturer identification | Character | O |
| SERIAL_NUM | Serial Number | Character | O |
| DVC_TYPE | Device type | Character | R |
| STATUS | Device Status | Character | R |
| DVC_MFG | Device Manufacturer | Character | O |
| DVC_MODEL | Device Model | Character | O |
| CHASSIS_SER_NUM | Chassis serial number | Character | O |
| LOOPBACK_IP | Loopback IP address | Character | O |
| SYS_NAME | System name | Character | O |
| SYS_DESC | System description | Character | O |
| SYS_OBJ_ID | System Object identification | Character | O |
| SYS_LOC | System location | Character | O |
| SNMPV2C_CAPABLE | SNMP v. 2c capability | Character | O |
| SNMPV3_CAPABLE | SNMP v. 3 capability | Character | O |
| OS_VER | OS version | Character | O |
| EFF_BEG_DT | Effective beginning date | Date | R |
| DVC_DESC | Device description | Character | O |
| DISCOVER_DT | Discover date | Date | R |
| NOTES | notes | Character | O |
| SNMP_SYS_LOC | SNMP system location | Character | O |
| MONITOR_FLG | Monitor flag | Character | O |

The device's entities 1512 relates to the memory components entities 1502, the storage components entities 1504, the bus components entities 1506, the interface cards entities 1510, the device console entities 1516, and the CPU components entities 1518 in one-to-many relationships. The devices entities 1512 also relate to the device authorizations entities 1416 in a one-to-many relationship 1426, the device request classes entities 1404 in a one-to-many relationship 1428, and the device application configuration entities 1414 in a one-to-many relationship 1430, all of which entities are illustrated in FIG. 14. Additionally, the devices entities 1512 relate to the virtual IPS entities 1312 in a one-to-many relationship 1330, the conduits entities 1306 in a one-to-many relationship 1332, the status entities 1322 in a many-to-one relationship 1324, all of which are illustrated in FIG. 13. Also, the devices entities may optionally be related in a one-to-many relationship 1248 to the device roles 1226 of FIG. 12.

Interface Type Entities 1514

The interface type entities 1514 relate to the type of interface achieved through the interface components represented by the interface components entities 1508. The variable set associated with the interface type entities 1514 is set forth below in Table 50.

TABLE 50

VARIABLE SET OF INTERFACE TYPE ENTITIES 1514

| VARIABLE | VARIABLE DEFINITION | VARIABLE TYPE | REQUIRED/ OPTIONAL |
|---|---|---|---|
| INT_TYPE* | Interface type | Character | R |
| INT_TYPE_DESC | Interface type description | Character | R |

The interface type entities 1514 relate to the interface components entities 1508 in a one-to-many relationship.

Device Console Entities 1516

The device console entities 1516 relate to consoles that may be attached to devices represented by the device entities 1512. The consoles may be for the convenience of a user in accessing information contained within the devices, or by accessing the network by way of the devices. The variable set associated with the device console entities 1516 is set forth below in Table 51.

TABLE 51

VARIABLE SET OF DEVICE CONSOLE ENTITIES 1516

| VARIABLE | VARIABLE DEFINITION | VARIABLE TYPE | REQUIRED/ OPTIONAL |
|---|---|---|---|
| DVC_ID | Device identification number | Number | R |
| CONSOLE_IP* | Console IP address | Character | R |
| CONSOLE_HOST_NAME | Console host name | Character | R |
| PORT | port number | Number | O |
| PHONE_NUM | Phone number | Character | O |
| EFF_BEG_DT | Effective beginning date | Date | R |

The device console entities 1516 relate to the device entities 1512 in a many-to-one relationship, as previously mentioned.

CPU Components Entities 1518

The CPU components entities 1518 relate to the various components of the CPUs of the devices which are represented by the device entities 1512. The CPU components entities 1518 have a series of variables associated therewith indicate information regarding the type of CPU, the speed, the family, the model, the slot, and other such information, which may be necessary in provisioning servers, to ensure that software is installed can be adequately handled by the CPU on a particular device. The variable set associated with the CPU components entities 1518 is set forth below in Table 52.

TABLE 52

VARIABLE SET OF CPU COMPONENTS ENTITIES 1518

| VARIABLE | VARIABLE DEFINITION | VARIABLE TYPE | REQUIRED/ OPTIONAL |
|---|---|---|---|
| DVC_ID | Device identification number | Number | R |
| CPU_COMPNT_ID* | CPU Component identification number | Number | R |
| CPU_FAM | CPU Family | Character | R |
| CPU_SPEED | CPU processing speed | Character | O |
| CPU_VEND | CPU vendor | Character | O |
| CPU_MODEL | CPU model | Character | O |
| CACHE_SIZE | cache size | Character | O |
| CPU_SLOT | CPU slot | Character | R |
| STEPPING | CPU versioning | Character | O |
| EFF_BEG_DT | Effective beginning date | Date | R |
| EFF_END_DT | Effective ending date | Date | O |
| STATUS | CPU status | Character | O |

The CPU components entities 1518 relate to the devices entities 1512 in a many-to-one relationship, as previously mentioned.

SUB Interfaces Entities 1520

The SUB interfaces 1520 relate the interface components of the interface components entities 1508 with the interface IP addresses of the interface IPs entities 1524. These SUB interfaces entities 1520 may be used with asynchronous transfer mode (ATM) frame relay systems, for example. The variable set associated with the SUB interfaces entities 1520 is set forth below in Table 53.

TABLE 53

VARIABLE SET OF SUB INTERFACES ENTITIES 1520

| VARIABLE | VARIABLE DEFINITION | VARIABLE TYPE | REQUIRED/ OPTIONAL |
|---|---|---|---|
| SUB_IF_ID* | SUB interface identification number | Number | R |
| IF_COMPNT_ID | Interface component identification number | Number | R |
| CIR_ID | Circuit identification number | Number | O |
| VCI | Virtual channel identifier | Character | O |
| VPI | Virtual path identifier | Character | O |
| TX_BNDWDTH | Transit bandwidth | Character | O |
| RX_BNDWDTH | Receive bandwidth | Character | O |
| EFF_BEG_DT | Effective beginning date | Date | R |

The SUB interfaces entities 1320 is related to the interface components entities 1508 in a many-to-one relationship, and to the interface IPs 1524 in a one-to-many relationship. The SUB interfaces entities 1520 may also be optionally related to the circuits entities 1522 in a many-to-one relationship.

Circuits Entities 1522

The circuits entities 1522 may be use to optionally relate to the SUB interfaces entities 1520. These entities 1522 allow for specific identification of the circuits associated with the SUB interfaces and the interface components, and the type and description of the circuits. The variable set associated with the circuits entities 1522 is set forth below in Table 54.

TABLE 54

VARIABLE SET OF CIRCUITS ENTITIES 1522

| VARIABLE | VARIABLE DEFINITION | VARIABLE TYPE | REQUIRED/ OPTIONAL |
|---|---|---|---|
| CIR_ID* | Circuit identification number | Number | R |
| CIR_TYPE | Circuit type | Character | R |
| CIR_DESC | Circuit description | Character | O |

The circuits entities 1522 may optionally relate to the SUB interfaces entities 1520 in a one-to-many relationship.

Interface IPs Entities 1524

The interface IPs entities 1524 may be used to relate the SUB interfaces represented by the SUB interfaces entities 1520 with VIP groups of the VIP groups entities 1424 shown in FIG. 14. The variable set associated with the interface IPs entities 1524 is set forth below in Table 55.

TABLE 55

VARIABLE SET OF INTERFACE IPS ENTITLES 1524

| VARIABLE | VARIABLE DEFINITION | VARIABLE TYPE | REQUIRED/ OPTIONAL |
|---|---|---|---|
| IF_IP_ID* | Interface IP identification number | Number | R |
| IP_ADDRESS | IP address | Character | R |
| SUB_IF_ID | SUB interface identification number | Number | R |
| NETMASK | Net Mask | Character | O |
| EFF_BEG_DT | Effective beginning date | Date | R |
| PRIMARY_IF | Primary interface | Character | O |

The interface IPs entities 1524 relates to the SUB interfaces entities 1520 in a many-to-one relationship and to the VIP groups entities 1424 of FIG. 14 in a one-to-many relationship 1432.

As indicated previously in connection with FIGS. 12-14, various relationships 1248, 1330, 1332, 1334, 1426, 1428, 1430, 1432 are directly related to entities within the hardware 1108 illustrated in FIG. 15 from these other figures representing the software 1102, the configuration 1104, and the monitoring 1106.

DNS 1110

Figure 16:
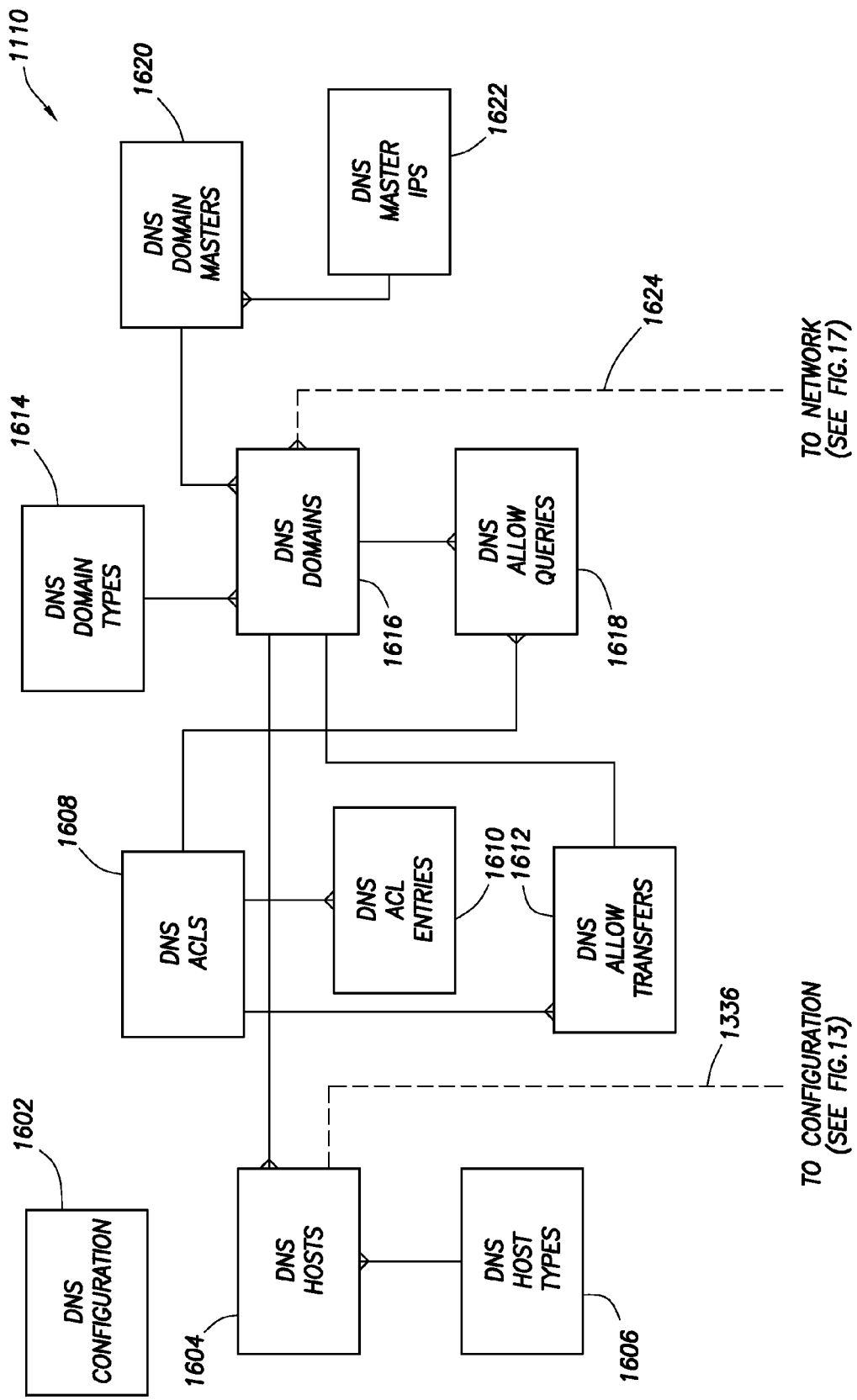
FIG. 16 is an entity relationship diagram illustrating the relationship between various entities relating to DNS capabilities within the data model of one embodiment of the present invention.

The entities illustrated in FIG. 16 are part of the DNS entities 1110. The DNS entities 1110 relate to the assignment of DNS domain names. These entities are related in an entity relationship diagram fashion.

DNS Configuration Entities 1602

The DNS configuration entities 1602 allow for the translation of DNS names to DNS values, and may be used by the business logic associated with the network of the present invention. These DNS names and values may be translated into addresses related to various network hosts. The variable set associated with the DNS configuration entities 1602 is set forth below in Table 56.

TABLE 56

VARIABLE SET OF DNS CONFIGURATION ENTITIES 1602

| VARIABLE | VARIABLE DEFINITION | VARIABLE TYPE | REQUIRED/ OPTIONAL |
|---|---|---|---|
| NAME | Name | Character | R |
| VALUE | Value | Character | R |

The DNS configuration entities 1602 are illustrated in FIG. 16 as having no direct relationship with any of the other entities illustrated therein. The values contained within the DNS configuration entities 1602 are used by business logic associated with the present invention, which is able to query the DNS configuration entity 1602 to relate between the entries of the name-value pairer associated with these entities 1602.

DNS Hosts Entities 1604

The DNS host entities 1604 relate to DNS hosts associated with the present invention. The DNS host entities 1604 provide for a unique manner in which multiple DNS hosts may be identified. Using multiple DNS hosts provided customer with a more efficient DNS service. For example, if a primary DNS host is not able to handle a request within a predefined time, the expire time set on a second DNS may lapse, causing the secondary DNS to handle the pending request. This is also known as a time to live (TTL). The variable set associated with the DNS hosts entities 1604 are indicated below in Table 57.

TABLE 57

VARIABLE SET OF DNS HOSTS ENTITIES 1604

| VARIABLE | VARIABLE DEFINITION | VARIABLE TYPE | REQUIRED/ OPTIONAL |
|---|---|---|---|
| DNS_HOST_ID* | DNS Host identification number | Number | R |
| DOMAIN_ID | Domain identification number | Number | R |
| DVC_HOST_TYPE | Device host type | Character | O |
| HOST_NAME | Host name | Character | R |
| DNS_HOST_DATA | DNS Host Data | Character | R |
| DNS_HOST_TYPE | DNS Host type | Character | R |
| EXPIRE | Time until expire | Number | O |
| EFF_BEG_DT | Effective beginning date | Date | R |
| MODIFIED_BY | Modified by | Character | O |

The DNS hosts entities 1604 are related to the DNS domains entities 1616, and the DNS host types entities 1606 in many-to-one relationships. The DNS host types entities 1606 in many-to-one relationships, the DNS hosts entities 1604 may optionally be related to the device role IP host entities 1308 illustrated in FIG. 3 in a one-to-many relationship 1336.

DNS Host Types Entities 1606

The DNS host types entities 1606 indicate the types of DNS hosts associated with the DNS hosts entities 1604. The variable set associated with the DNS hosts types entities 1606 is set forth below in Table 58.

TABLE 58

VARIABLE SET OF DNS HOST TYPES ENTITIES 1606

| VARIABLE | VARIABLE DEFINITION | VARIABLE TYPE | REQUIRED/ OPTIONAL |
|---|---|---|---|
| DNS_HOST_TYPE* | DNS Host type | Character | R |
| DNS_HOST_TYPE_DESC | DNS Host type description | Character | O |

The DNS host types entities 1606 are related to the DNS hosts entities 1604 in a one-to-many relationship.

DNS ACLs Entities 1608

The DNS ACLs entities 1608 relate to the access control lists associated with various DNS. The variable set associated with the DNS ACLs entities 1608 is set forth below in Table 59.

TABLE 59

VARIABLE SET OF DNS ACLS ENTITIES 1608

| VARIABLE | VARIABLE DEFINITION | VARIABLE TYPE | REQUIRED/ OPTIONAL |
|---|---|---|---|
| ACL_ID* | ACL identification number | Number | R |
| ACL_DESC | ACL Description | Character | O |
| ACL_NAME | ACL Name | Character | R |

The DNS ACLs entities 1608 are related to the DNS ACL entries entities 1610, the DNS allow transfers entities 1612, and the DNS allow queries entities 1618 in one-to-many relationships.

DNS ACL Entries Entities 1610

The DNS ACL entries entities 1610 relate to the ACL entries for the DNS. The variable set associated with the DNS ACL entries entities 1610 is set forth below in Table 60.

TABLE 60

VARIABLE SET OF DNS ACL ENTRIES ENTITIES 1610

| VARIABLE | VARIABLE DEFINITION | VARIABLE TYPE | REQUIRED/ OPTIONAL |
|---|---|---|---|
| ACL_ENTRY_ID | ACL entry identification number | Number | R |
| NET | Net | Character | R |
| MASK | Mask | Character | O |
| ACL_ID | ACL identification number | Number | R |

The DNS ACL entries entities are related to the DNS ACLs entities 1608 in a many-to-one relationship, as previously mentioned.

DNS Allow Transfers Entities 1612

The DNS allow transfers entities 1612 is used to determine whether or not DNS transfers may take place between given DNs domains according to the ACLs of the DNS ACLs entities 1608. The variable set associated with the DNS allow transfers entities 1612 is set forth below in Table 61.

TABLE 61

VARIABLE SET OF DNS ALLOW TRANSFERS ENTITIES 1612

| VARIABLE | VARIABLE DEFINITION | VARIABLE TYPE | REQUIRED/ OPTIONAL |
|---|---|---|---|
| DOMAIN_ID* | Domain identification number | Number | R |
| ACL_ID* | ACL identification number | Number | R |
| TRANSFER_DESC | Transfer description | Character | O |
| EFF_BEG_DT | Effective beginning date | Date | R |

The DNS allow transfers entities 1612 are related to the DNS ACLs entities 1608 and the DNS domains entities 1616 in many-to-one relationships.

DNS Domain Types Entities 1614

The DNS domain types entities 1614 relate to the types of DNS domains associated with the DNS domain entities 1616. The variable set associated with the DNS domain types entities 1614 is set forth below in Table 62.

TABLE 62

VARIABLE SET OF DNS DOMAIN TYPES ENTITIES 1614

| VARIABLE | VARIABLE DEFINITION | VARIABLE TYPE | REQUIRED/ OPTIONAL |
|---|---|---|---|
| DNS_DOMAIN_TYPE* | DNS Domain type | Character | R |
| DOMAIN_TYPE_DESC | Domain type description | Character | O |

The DNS domain types entities 1614 relate to the DNS domain entities 1614 in a one-to-many relationship.

DNS Domain Entities 1616

The DNS domain entities 1616 relate to the various DNS domains associated with devices connected to the network of the present invention. The variables associated with the DNS domain entities 1616 relate to domains maintained by a host, in accordance with an embodiment of the present invention. A DNS term "SOA" or start of authority, is used to define several variables. For example, a serial variable is given, which indicates the revision number of the DNS file used to look up domain names. A refresh rate is set, which may be adjusted according to the speed with which the DNS file is updated on a primary DNS, to control how often a secondary DNS updates its DNS file. Also, an expire time, which indicates the time that a secondary DNS will wait until taking over a domain name request may be set. A minimum cash time for a particular entry, and a name server are provided for variables of the DNS domain entity 1616. Also, an administrative contact e-mail address is provided for each domain. A retry variable may also be provided whereby after a certain amount of time, or a certain amount of attempts, a DNS must assume the role of the primary DNS. A rebuilt date is given, whereby the system, or agents of the system, know that if this date is changed, then the server needs to rebuild. One of the advantages of the present invention is that DNS entries are not created in the DNS server, but rather are contained within a separate database with specific forms that define acceptable DNS entries. The variable set associated with the DNS domain entities 1616 is set forth below in Table 63.

TABLE 63

VARIABLE SET OF DNS DOMAINS ENTITIES 1616

| VARIABLE | VARIABLE DEFINITION | VARIABLE TYPE | REQUIRED/ OPTIONAL |
|---|---|---|---|
| DOMAIN_ID* | Domain identification number | Number | R |
| DNS_DOMAIN_TYPE | DNS Domain type | Character | R |
| DOMAIN_NAME | Domain name | Character | R |
| SOA_SERIAL | Start of authority serial | Character | R |
| SOA_REFRESH | Start of authority refresh | Character | R |
| SOA_EXPIRE | Start of authority expire | Character | R |
| SOA_MIN | Start of authority minimum | Character | R |
| SOA_NS | Start of authority name server | Character | R |
| SOA_EMAIL | Start of authority e-mail contact | Character | R |
| SOA_RETRY | Start of authority retry times | Character | R |
| MOD_DT | Date modified | Date | O |
| MOD_BY | Modified by | Character | O |
| REBUILD_DT | Rebuild date | Date | O |
| ACCT_ID | Account identification number | Number | O |
| EFF_BEG_DT | Effective Beginning date | Date | R |

A DNS domain entities 1616 are related in many-to-one relationships with the DNS domain types entities 1614, as previously discussed, and the DNS domain masters entities 1620. Additionally, the DNS domains entities 1616 relate to the DNS hosts entities 1604, the DNS allow transfers entities 1612, and the DNS queries entities 1618 in one-to-many relationships. Also, the DNS domains entities 1616 may optionally relate to the accounts entities 1702 of the network entities 1112, illustrated in FIG. 17, in a many-to-one relationship 1624.

DNS Allow Queries Entities 1618

The DNS allow queries entities 1618 assist in determining whether or not queries may be allowed between certain DNS domains, according to the DNs ACLs of the DNS ACLs entities 1608. The variable set associated with the DNS allow queries entities 1618 is set forth below in Table 64.

TABLE 64

VARIABLE SET OF DNS ALLOW QUERIES ENTITIES 1618

| VARIABLE | VARIABLE DEFINITION | VARIABLE TYPE | REQUIRED/ OPTIONAL |
| --- | --- | --- | --- |
| DOMAIN_ID* | Domain identification number | Number | R |
| ACL_ID* | ACL identification number | Number | R |
| QUERY_DESC | Query description | Character | O |
| EFF_BEG_DT | Effective beginning date | Date | R |

The DNS allow queries entities 1618 related to the DNS ACLs entities 1608 and the DNS domains entities 1616 in many-to-one relationships.

DNS Domain Masters Entities 1620

The DNS domain masters entities 1620 relates the DNS domain of the DNS domain entities 1616 with the DNS master IPs of the DNS master IPs entities 1622. The variable set associated with the DNS domain masters entities 1620 is set forth below in Table 65.

TABLE 65

VARIABLE SET OF DNS DOMAIN MASTERS ENTITIES 1620

| VARIABLE | VARIABLE DEFINITION | VARIABLE TYPE | REQUIRED/ OPTIONAL |
| --- | --- | --- | --- |
| DOMAIN_ID* | Domain identification number | Number | R |
| DNS_MASTER_IP_ID | DNS Master IP identification number | Number | R |
| EFF_BEG_DT | Effective beginning date | Date | R |

The DNS domain masters entities 1620 are related to the DNS domains entities 1616 in a one-to-many relationship, and to the DNS master IPs entities 1622 in a many-to-one relationship.

DNS Master IPs Entities 1622

The DNS master IPs entities 1622 relate to the DNS master IP addresses of the devices on the network associated with the present invention. The variable set associated with the DNS master IPs entities 1622 is set forth below in Table 66.

TABLE 66

VARIABLE SET OF DNS MASTER IPS ENTITIES 1622

| VARIABLE | VARIABLE DEFINITION | VARIABLE TYPE | REQUIRED/ OPTIONAL |
| --- | --- | --- | --- |
| DNS_MASTER_IP_ID* | DNS master IP identification number | Number | R |

TABLE 66-continued

VARIABLE SET OF DNS MASTER IPS ENTITIES 1622

| VARIABLE | VARIABLE DEFINITION | VARIABLE TYPE | REQUIRED/ OPTIONAL |
| --- | --- | --- | --- |
| IP_ADDR | IP address | Character | R |
| MASTER_DESC | Master description | Character | O |

The DNS master IPs entities 1622 relate to the DNS domain masters entities 1620 in a one-to-many relationship.

The relationship 1336 is between the DNS host entities 1604 and an entity illustrated in FIG. 13, within the configuration entities 1104. Additionally, the relationship 1624 relates the DNS domain entities 1616 with an entity in FIG. 17 of the network entities 1112.

Network 1112

The entities illustrated in an entity relationship diagram in FIG. 17 form part of the network entities 1112. The Network entities 1112 define various aspects of the network with which the present invention may be used. Each of these entities is described below.

Accounts Entities 1702

The accounts entities 1702 relate directly to customer network accounts. The variable set associated with the accounts entities 1702 is set forth below in Table 67.

TABLE 67

VARIABLE SET OF ACCOUNTS ENTITIES 1702

| VARIABLE | VARIABLE DEFINITION | VARIABLE TYPE | REQUIRED/ OPTIONAL |
| --- | --- | --- | --- |
| ACCT_ID* | Account identification number | Number | R |
| ACCT_NAME | Account name | Character | R |
| DISPLAY_NAME | Display name | Character | O |
| STATUS | Status | Character | R |
| LOG_HOST | Host name for web logs | Character | O |
| AUTH_DOMAIN | Authentication Domain | Character | O |

The accounts entities 1702 relate to the account configuration entities 1704 and the customer tiers entities 1708 in one-to-many relationships. Additionally, as previously indicated, the accounts entities 1702 relate to the units entities 1202, the packages entities 1240, and the account roles entities 1224 of FIG. 12, in one-to-many relationships. Also, the accounts entities 1702 may optionally be related in a one-to-many relationship 1624 with the DNS hosts entities 1604 of FIG. 16.

Account Configuration Entities 1704

The account configuration entities 1704 relate to the configuration of the accounts associated with the account entities 1702. The variable set associated with the account configuration entities 1704 is set forth below in Table 68.

TABLE 68

VARIABLE SET OF ACCOUNT CONFIGURATION ENTITIES 1704

| VARIABLE | VARIABLE DEFINITION | VARIABLE TYPE | REQUIRED/ OPTIONAL |
|---|---|---|---|
| ACCT_10 | Account identification number | Number | R |
| KEY_NAME | Key name | Character | R |
| ACCT_CONFIG_ID* | Account configuration identification number | Number | R |

The account configuration entities 1704 relate to the accounts entities 1702 in a many-to-one relationship.

Account Configuration Values Entities 1706

The account configuration values entities 1706 indicate various values associated with the configuration of various accounts related to the account configuration entities 1704. The variable set associated with the account configuration values entities 1706 is set forth below in Table 69.

TABLE 69

VARIABLE SET OF ACCOUNT CONFIGURATION VALUES ENTITIES 1706

| VARIABLE | VARIABLE DEFINITION | VARIABLE TYPE | REQUIRED/ OPTIONAL |
|---|---|---|---|
| ACCT_CONFIG_ID* | Account configuration identification number | Number | R |
| CONFIG_VALUE | Configuration value | Character | R |
| TEXT_ORDER* | Text Order of configuration value chunk | Number | R |

The account configuration values entities 1706 relate to the account configuration entities 1704 in many-to-one relationships.

Customer Tiers Entities 1708

The customer tiers entities 1708 relate to various customer tiers, whereby customers may receive, and have access to, specific services associated with specific tiers. For example, a specific customer may desire to distribute his webhosting servers to multiple data centers. Therefore, the variables associated with the Customer tiers entities 1708 may indicate a data center or identification number, which informs one as to the location of the customer tier represented by the customer tier entity 1708. Also, a flag may be set to indicate whether or not monitoring is desired or needed within that particular network. The variable set associated with the customer tiers entities 1708 is illustrated below in Table 70.

TABLE 70

VARIABLE SET OF CUSTOMER TIERS ENTITIES 1708

| VARIABLE | VARIABLE DEFINITION | VARIABLE TYPE | REQUIRED/ OPTIONAL |
|---|---|---|---|
| CUST_TIER_ID* | Customer tier identification number | Number | R |

TABLE 70-continued

VARIABLE SET OF CUSTOMER TIERS ENTITIES 1708

| VARIABLE | VARIABLE DEFINITION | VARIABLE TYPE | REQUIRED/ OPTIONAL |
|---|---|---|---|
| ACCT_ID | Account identification number | Number | R |
| DATA_CENTER_ID | Data center identification number | Number | R |
| MONITOR_FLG | Monitor Flag | Character | O |

The customer tiers entities 1708 relate to the accounts entities 1702, as previously discussed, and the data centers entities 1716, in many-to-one relationships. The customer tiers entities 1708 also relate to the VLAM compartments entities 1714 in a one-to-many relationship.

Data Center Configuration Values Entities 1710

The data center configuration values entities 1710 relate to the configuration values associated with the data center configuration, which are associated with the data center configuration entities 1712. The variables associated with the data center configuration values entities 1710 are the value portion of a name-value pair relating to the data center. Thus, a configuration value, associated with such a name-value pair is given by the data center configuration values entities 1710. The variable set associated with the data center configuration values entities 1710 is set forth below in Table 71.

TABLE 71

VARIABLE SET OF DATA CENTER CONFIGURATION VALUES ENTITIES 1710

| VARIABLE | VARIABLE DEFINITION | VARIABLE TYPE | REQUIRED/ OPTIONAL |
|---|---|---|---|
| DATA_CENTER_CONFIG_ID* | Data center configuration identification number | Number | R |
| CONFIG_VALUE | Configuration values | Character | R |
| TEXT_ORDER* | Text Order | Number | R |

The data center configuration values entities 1710 relate to the data center configuration entities 1712 in a many-to-one relationship.

Data Center Configuration Entities 1712

The data center configuration entities 1712 relate to the configuration of specific data centers that house specific servers, and other network equipment associated with services of the various customer tiers. The data center configuration entities 1712 form the name portion of the name-value pair associated with the data center configuration values entities 1710. Thus, a key name, which serves as the name in the name-value pair. The variable set associated with the data center configuration entities 1712 is set forth below in Table 72.

TABLE 72

VARIABLE SET OF DATA CENTER CONFIGURATION ENTITIES 1712

| VARIABLE | VARIABLE DEFINITION | VARIABLE TYPE | REQUIRED/ OPTIONAL |
|---|---|---|---|
| DATA_CENTER_ID | Data Center identification number | Number | R |

TABLE 72-continued

VARIABLE SET OF DATA
CENTER CONFIGURATION ENTITIES 1712

| VARIABLE | VARIABLE DEFINITION | VARIABLE TYPE | REQUIRED/ OPTIONAL |
|---|---|---|---|
| KEY_NAME | Key Name | Character | R |
| DATA_CENTER_ID* | Data center identification number | Number | R |

The data center configuration entities 1712 relate to the data centers entities 1716 in a many-to-one relationship.

VLAN Compartments Entities 1714

The VLAN compartments entities 1714 are used to relate the customer tiers of the customer tiers entities 1708 with various VLAN IP pools of the VLAN IP pools entities 1722. The variable set associated with the VLAN compartments entities 1714 is set forth below in Table 73.

TABLE 73

VARIABLE SET OF VLAN COMPARTMENTS ENTITIES 1714

| VARIABLE | VARIABLE DEFINITION | VARIABLE TYPE | REQUIRED/ OPTIONAL |
|---|---|---|---|
| VLAN_COMP_ID* | VLAN Compartment identification number | Number | R |
| CUST_TIER_ID | Customer tier identification number | Number | R |
| COMP_NAME | Compartment name | Character | R |
| STATUS | VLAN status | Character | R |
| ASSIGN_DT | Assign Date | Date | O |

The VLAN compartments entities relate to the customer tiers entities 708 in a many-to-one relationship as previously discussed, also, the VLAN compartments entities 1714 relate to the VLAN IP pools 1722 in a one-to-many relationship.

Data Centers Entities 1716

The data centers entities 1716 relate to various data centers in which server equipment, and other network devices are housed. The data centers entities 1716 contain variables that describe various aspects of the data centers to which these entities 1716 relate. For example, a DNS sequence is given, which is a sequential number, that is used in an algorithm to provide a next random DNS name. Generally, the DNS names used by each of the data center entities 1716 contain the name of the data center therein, with which they most closely relate, and therefore there is no conflict of DNS names between data centers. Additionally, a mask may be given that indicates how a particular server may be located by way of parsing the location of its rack. The variable set associated with the data centers entities 1716 is set forth below in Table 74.

TABLE 74

VARIABLE SET OF DATA CENTERS ENTITIES 1716

| VARIABLE | VARIABLE DEFINITION | VARIABLE TYPE | REQUIRED/ OPTIONAL |
|---|---|---|---|
| DATA_CENTER_ID* | Data Center identification number | Number | R |
| DATA_CEN- TER_NAME | Data Center name | Character | R |

TABLE 74-continued

VARIABLE SET OF DATA CENTERS ENTITIES 1716

| VARIABLE | VARIABLE DEFINITION | VARIABLE TYPE | REQUIRED/ OPTIONAL |
|---|---|---|---|
| DNS_SUBDOMAIN | DNS sub-domain | Character | O |
| DNS_SEQUENCE | DNS sequence for name generation | Character | O |
| DISPLAY_NAME | DNS name displayed | Character | O |
| RACK_LOCA- TION_MASK | Rack location mask | Character | O |

The data center entities 1716 relate to the customer tiers entities 1708 and the data center configuration entities 1712 in one-to-many relationships.

Site Configuration Entities 1718

The site configuration entities 1718 relate to a configuration of various data center sites. The site configuration entities 1718 is a name-value pairer that may be used for any convenient purpose, such as accounting, data center, maintenance, device configuration, and the like. This relationship table may be used by way of business logic associated with the present invention, or with agents residing on particular devices connected to the network. The variable set associated with the site configuration entities 1718 is set forth below in Table 75.

TABLE 75

VARIABLE SET OF SITE CONFIGURATION ENTITIES 1718

| VARIABLE | VARIABLE DEFINITION | VARIABLE TYPE | REQUIRED/ OPTIONAL |
|---|---|---|---|
| PARAM_NAME* | Parameter name | Character | R |
| PARAM_VALUE | Parameter value | Character | O |

The site configuration entities 1718 illustrated in FIG. 17 is not directly related to the entities illustrated in the same figure. However, the values contained therein may relate to other entities illustrated in FIG. 17, and may be used by business logic associated with the present invention, or by intelligent agents of the system.

Device Pool VLAN Platforms Entities 1720

The device pool VLAN platforms entities 1720 relate to platforms of the device pool within the VLAN. That is, the device pool VLAN platforms entities 1720 is used to relate a base OS to the VLAN with which a particular device is associated. The variable set associated with the device pool VLAN platforms entities 1720 is set forth below in Table 76.

TABLE 76

VARIABLE SET OF DEVICE POOL
VLAN PLATFORMS ENTITIES 1720

| VARIABLE | VARIABLE DEFINITION | VARIABLE TYPE | REQUIRED/ OPTIONAL |
|---|---|---|---|
| VLAN_POOL_ID | VLAN pool identification number | Number | R |
| PLATFORM_ID | Platform identification number | Number | R |

The device pool VLAN platforms entities 1720 relate to the VLAN IP pools entities in a many-to-one relationship.

VLAN IP pools Entities 1722

The VLAN IP pools entities 1722 relate to IP pools of the VLAN, which are associated with the VLAN compartments of the customer tiers that are associated with the customer tiers entities 1708. The variable set associated with the VLAN IP pools entities 1722 is set forth below in Table 77.

TABLE 77

VARIABLE SET OF VLAN IP POOLS ENTITIES 1722

| VARIABLE | VARIABLE DEFINITION | VARIABLE TYPE | REQUIRED/ OPTIONAL |
|---|---|---|---|
| VLAN_POOL_ID* | VLAN pool identification number | Number | R |
| POOL_TYPE | Pool type | Character | R |
| VLAN_POOL_NAME | VLAN pool name | Character | R |
| GATEWAY_IP | Gateway IP address | Character | R |
| NETMASK_IP | Network IP address | Character | R |
| BROADCAST_IP | Broadcast IP address | Character | R |
| SUBNET | Subnet | Character | R |
| DHCP_GATEWAY | DHCP Gateway | Character | O |
| NIS_DOMAIN | Network information services domain | Character | O |
| YP_SERVER | Yellow pages server | Character | O |
| NTP_SERVER | Network time protocol server | Character | O |
| DOMAIN | Domain | Character | O |
| SUB_TYPE | Network sub-type | Character | R |
| POOL_DESC | Pool description | Character | O |
| VLAN_NAME | VLAN name | Character | O |
| VLAN_COMP_ID | VLAN component identification number | Number | R |
| CIDR | Classless inter-domain routing | Number | R |

The VLAN IP pools entities 1722 relate to the VLAN compartments 1714 in a many to one relationship, and to the device pool VLAN platforms 1720 in a one to many relationship, as previously described. Also, the VLAN IP pools entities 1722 relate to the IP addresses entities 1730 in a one to many relationship, and the VLAN subtype entities 1728 in a many to one relationship.

Data Center Tiers Entities 1724

The data center tiers entities 1724 relate to a specific group of services, or tiers, associated with the data centers, which are represented by the data centers entities 1716. The variable set associated with the data center tiers entities 1724 is set forth below in Table 78.

TABLE 78

VARIABLE SET OF DATA CENTER TIERS ENTITIES 1724

| VARIABLE | VARIABLE DEFINITION | VARIABLE TYPE | REQUIRED/ OPTIONAL |
|---|---|---|---|
| DCT_ID* | Data center tier identification number | Number | R |
| DATA_CENTER_ID | Data center identification number | Number | R |
| APP_ROLE_ID | Application role identification number | Number | R |
| TIER_NAME | Tier name | Character | R |

The data center tiers entities 1724 relate to the data centers entities 1716 in a many to one relationship, as previously explained. The data center tiers entities 1724 also relate to the application rules entities 1236, illustrated in FIG. 12, in a many to one relationship 1244.

VLAN Pool Type Entities 1726

The VLAN pool type entities 1726 define the various valid types of VLANs for use on the network associated with the present invention. The variable set associated with the VLAN pool type entities is set forth below in Table 79.

TABLE 79

VARIABLE SET OF VLAN POOL TYPE ENTITIES 1726

| VARIABLE | VARIABLE DEFINITION | VARIABLE TYPE | REQUIRED/ OPTIONAL |
|---|---|---|---|
| POOL_TYPE* | Pool type | Character | R |
| POOL_TYPE_DESC | Pool type description | Character | O |
| GEN_DHCP | Generate DHCP | Character | R |

The VLAN pool type entities 1726 are not illustrated as directly relating to any entities within FIG. 17. However, the variables stored within the VLAN pool type entities 1726 are used by the logic associated with the present invention for determining the valid types of VLANs that may be used with the present invention.

VLAN SUB Type Entities 1728

The VLAN SUB type entities 1728 are used to relate to the VLAN IP pools, which are represented by the VLAN IP pools entities 1722. The VLAN SUB type entities 1728 define valid VLAN types, or types in which VLANs may be used. Some examples might include development, quality assurance, production, and the like. The VLAN subtype entities 1728 relate to the VLAN IP pools 1722 in a one to many relationship, as previously described. The variable set of the VLAN SUB type entities 1728 is shown below in Table 80.

TABLE 80

VARIABLE SET OF VLAN SUB TYPE ENTITIES 1728

| VARIABLE | VARIABLE DEFINITION | VARIABLE TYPE | REQUIRED/ OPTIONAL |
|---|---|---|---|
| SUB_TYPE* | Type of VLAN | Character | R |
| SUB_TYPE_DESC | VLAN type description | Character | O |

IP Address Entities 1730

The IP address entities 1730 relate to the IP addresses of the network associated with the present invention. The variable set associated with the IP address entities 1730 is shown below in Table 81.

TABLE 81

VARIABLE SET OF IP ADDRESSES ENTITIES 1730

| VARIABLE | VARIABLE DEFINITION | VARIABLE TYPE | REQUIRED/ OPTIONAL |
|---|---|---|---|
| IP_ADDRESS* | IP Address | Character | R |
| VLAN_POOL_ID | VLAN Pool identification number | Number | R |
| STATUS | Device status | Character | R |
| GEN_HOST_NAME | | Character | O |

The IP address entities 1730 relate to the VLAN IP pools 1722 in a many to one relationship, as previously discussed. Also, the IP addresses entities 1730 relate to the virtual IPs entities 1312, and the device role IP host entities 1308 by one to many relationships, 1338, 1340, respectively VLAN CIDR Reserve Entities 1732

The VLAN CIDR reserve entities 1732 is related to the classless inter-domain routing (CIDR) of the VLAN associated with the present invention. The VLAN CIDR reserve entities indicates the CIDR number used for the network, and the number of addresses that are reserved and that are available for dynamic assignment as DHCP generated addresses. The variable set associated with the VLAN CIDR entities 1732 is set forth below in Table 82.

TABLE 82

VARIABLE SET OF VLAN CIDR RESERVE ENTITIES 1732

| VARIABLE | VARIABLE DEFINITION | VARIABLE TYPE | REQUIREDI OPTIONAL |
|---|---|---|---|
| CIDR | CIDR | Number | R |
| NTWK_RSV_CNT | Network reserve count | Number | R |
| DHCP_RSV_CNT | DHCP reserve count | Number | R |

The VLAN CIDR reserve entities 1732 is illustrated in FIG. 17 as not directly relating to any of the other entities. These entities 1732 are used by the business logic of the present invention to determine the number of network addresses that may be reserved, and the number that may be generated as DHCP generated addresses for a given network or subnetwork.

Queues 1114

Figure 18:
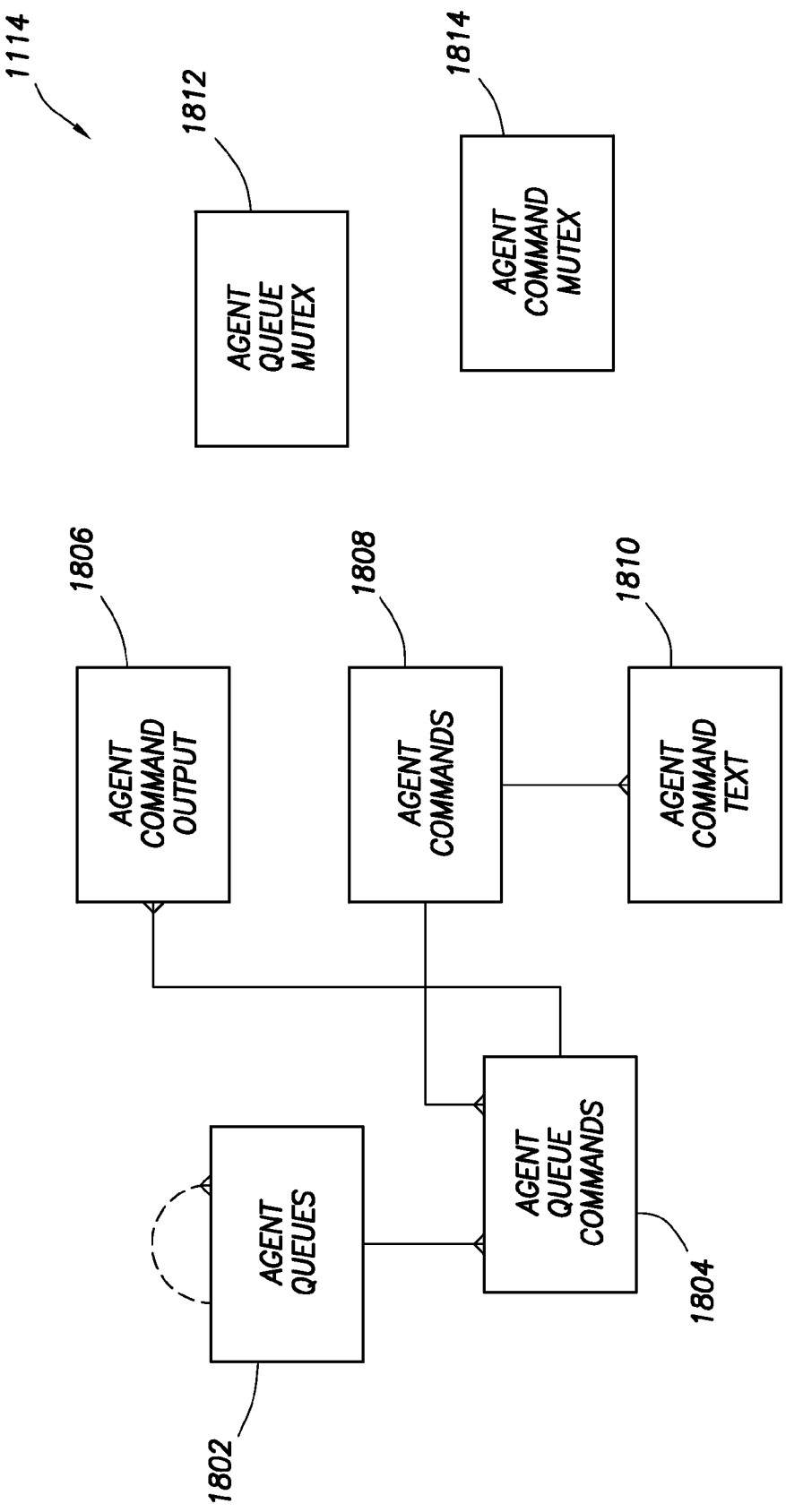
FIG. 18 is an entity relationship diagram illustrating the relationship between various entities relating to queues within the data model of one embodiment of the present invention.

The entities illustrated in the entity relationship diagram of FIG. 18 form the queues entities 1114. These entities are described in detail below. These entities are not directly related to the entities of the rest of the data model 1100 shown in FIG. 11 but rather are used by agents of specific devices connected to the network in performing various tasks. These tasks are represented in queues, which may be executed in a specific, given order.

Agent Queues Entities 1802

The agent queues entities 1802 queues entities are essentially a list of tasks to be performed by an intelligent agent operating on a device connected to the network, which is associated with the present invention. The variable set of agent queues entities 1802 is shown below in Table 83.

TABLE 83

VARIABLE SET OF AGENT QUEUES ENTITIES 1802

| VARIABLE | VARIABLE DEFINITION | VARIABLE TYPE | REQUIRED/ OPTIONAL |
|---|---|---|---|
| AGENT_QUEUED_ID | Agent Queue identification number | Number | R |
| DVC_ID | Device, identification number | Number | R |
| AGENT_QUEUE_NAME | Agent Queue Name | Character | R |
| ACTIVE | Active | Character | R |
| STATE | State | Character | R |
| HALT_ON_ERROR | Halton error | Character | R |
| PREDICATED_ID | Pedicated identification number | Number | O |
| IP_ADDRESS | IP address | Character | R |
| MODIFIED_DT | Date modified | Date | O |
| CREATE_DT | Date created | Date | R |
| FIRST_POKE_DT | Date of first poke | Date | O |

The agent queues entities 1802 is illustrated as having a one to many relationship with the agent queue commands entities 1804. The agent queues entities 1802 may also have an optional one to many relationship with other agent queues, as illustrated by the broken line in FIG. 18.

Agent Queue Commands Entities 1804

The agent queue commands entities 1804 serves to relate the agent queues entities 1802 with specific agent commands and agent command outputs. The variable set of agent queue commands entities 1804 is shown below in Table 84.

TABLE 84

VARIABLE SET OF AGENT QUEUE COMMANDS ENTITIES 1804

| VARIABLE | VARIABLE DEFINITION | VARIABLE TYPE | REQUIRED/ OPTIONAL |
|---|---|---|---|
| AGENT_QUEUE_COM_ID* | Agent Queue Command identification number | Number | R |
| AGENT_QUEUE_ID | Agent Queue identification number | Number | R |
| AGENT_COM_ID | Agent Command identification number | Number | R |
| COM_ORDER | Command Order | Number | R |
| ACTIVE | Agent Active | Character | R |
| STATE | Agent State | Character | R |
| START_TIME | Start time | Date | O |
| END_TIME | End time | Date | O |

The agent queue commands entities 1804 are related to the agent queues entities 1802, as previously discussed, and the agent commands 1808 in many to one relationships. Also, the agent queue commands entities 1804 are related to the agent command output entities 1806 in a one to many relationship.

Agent Command Output Entities 1806

The agent command output entities 1806 relate to the output of specific commands to agents of the present invention. The variable set of agent command output entities 1806 is shown below in Table 85.

TABLE 85

VARIABLE SET OF AGENT COMMAND OUTPUT ENTITIES 1806

| VARIABLE | VARIABLE DEFINITION | VARIABLE TYPE | REQUIRED/ OPTIONAL |
|---|---|---|---|
| AGENT_QUEUE_COM_ID* | Agent Queue Command identification number | Number | R |
| TEXT_ORDER* | Text order | Number | R |
| OUTPUT_TEXT | Output text | Character | R |
| CREATE_DT | Date created | Date | R |

The agent command output entities 1806 relate to the agent queue commands entities 1804 in a many to one relationship.

Agent Commands Entities 1808

The agent commands entities 1808 represent specific commands to be executed by agents associated with the present invention. The variable set of agent commands entities 1808 is shown below in Table 86.

TABLE 86

VARIABLE SET OF AGENT COMMANDS ENTITIES 1808

| VARIABLE | VARIABLE DEFINITION | VARIABLE TYPE | REQUIRED/ OPTIONAL |
|---|---|---|---|
| AGENT_COM_ID* | Agent command identification number | Number | R |
| COM_TYPE | Command type | Character | R |
| COM_NAME | Command name | Character | O |
| EFF_BEG_DT | Effective beginning date | Date | R |
| EFF_END_DT | Effective ending date | Date | O |

The agent commands entities 1808 relate to the agent queue commands entities 1804, as previously indicated, and the agent command text entities 1810, in one to many relationships.

Agent Command Text Entities 1810

The agent command text entities 1810 represents specific text associated with the agent commands, which are represented by the agent command entities 1808. Additionally, an order of the text may be given, thereby allowing the agent to determine the order of the text to be executed. The variable set of agent command text entities 1810 is shown below in Table 87.

TABLE 87

VARIABLE SET OF AGENT COMMAND TEXT ENTITIES 1810

| VARIABLE | VARIABLE DEFINITION | VARIABLE TYPE | REQUIRED/ OPTIONAL |
|---|---|---|---|
| AGENT_COM_ID* | Agent Command identification number | Number | R |
| COM_TEXT | Command text | Character | R |
| TEXT_ORDER* | Text order | Number | R |

The agent command text entities 1810 relate to the agent commands entities 1808 in a many to one relationship.

Agent Queue Mutex Entities 1812

The agent queue mutex entities 1812 serves as a locking device, which signals to an agent at a particular device is currently busy, and prevents the agent from executing a second queue on that device until the device is not busy. The variable set of agent queue mutex entities 1812 is shown below in Table 88.

TABLE 88

VARIABLE SET OF AGENT QUEUE MUTEX ENTITIES 1812

| VARIABLE | VARIABLE DEFINITION | VARIABLE TYPE | REQUIRED/ OPTIONAL |
|---|---|---|---|
| DVC_ID* | Device identification number | Number | R |

The agent queue mutex entities 1812 do not relate directly to any of the entities illustrated in FIG. 18, but rather are either queried by the agents with which they are associated, or broadcast information to those agents.

Agent Command Mutex Entities 1814

The agent command mutex entities 1814 serve as a locking device whereby only a single agent queue may be executed by the agent at any given time. This prevents an agent from attempting to accomplish more than one task at a single time. The variable set of agent command mutex entities 1814 is shown below in Table 89.

TABLE 89

VARIABLE SET OF AGENT COMMAND MUTEX ENTITIES 1814

| VARIABLE | VARIABLE DEFINITION | VARIABLE TYPE | REQUIRED/ OPTIONAL |
|---|---|---|---|
| AGENT_QUEUE_ID | Agent Queue identification number | Number | R |

The agent command mutex entities 1814 do not relate directly to any of the entities illustrated in FIG. 18, but rather are either queried by the agents with which they are associated, or broadcast information to those agents.

The foregoing description has been provided in the context of one data model used in connection with one provisioning network that may be used to control devices at one data center. It will be appreciated that such a network can be part of a larger network which controls devices at several data centers. The data model entities would merely need to be expanded to include networks located offsite. Hence, if an entity has its website infrastructure apportioned over several data centers, the provisioning operations can be coordinated amongst the various centers by using the data model of the present invention.

From the foregoing, therefore, it can be seen that the present invention provides a data model for use in system for the automated provisioning of devices which constitute the infrastructure of a website, such as servers. Two significant advantages provided by the data model are flexibility and the repeatability of the results that are obtained. The flexibility permits the varied needs of different websites to be readily accommodated, and thereby avoids the limitation of having to configure the architecture of every site the same way. The repeatability ensures that every server will have the proper set of software components once it has been provisioned, and thereby be ready to operate immediately. In addition to these features, the automated provisioning that is provided through this system achieves a significant time savings, enabling the entire process to be accomplished in substantially less than one hour for each device.

It will be appreciated by those of ordinary skill in the art that the present invention can be embodied in other forms without departing from the spirit or essential characteristics thereof. For instance, while an exemplary embodiment of the invention has been described in the context provisioning website servers in a data center, it will be appreciated that the principles underlying the invention can be applied in any environment where computing devices need to be configured and/or updated on a relatively large scale. The foregoing description is therefore considered to be illustrative, and not restrictive. The scope of the invention is indicated by the following claims, and all changes that come within the meaning and range of equivalents are therefore intended to be embraced therein.

What is claimed is:

1. A provisioning method employing a DNS data model for relating DNS objects of a computer network to other DNS objects, and for expressing the software objects of a computer network in a form accessible by other network components, the method comprising:
configuring a central database to be able to implement the DNS data model, the DNS data model including:
DNS domains entities that represent DNS domains of devices connected to a computer network and are related to various entities representing DNS permissions and types selected from the group consisting of DNS ACLs entities, DNS ACL entries entities, DNS allow transfers entities, DNS allow queries entities, DNS domain types entities, DNS domain masters entities, and DNS master IPs entities; and
DNS hosts entities that represent various DNS hosts connected to the computer network; and
automatically provisioning the computer network according to the DNS data model.

2. The method of claim 1, wherein said DNS domains entities represent the DNS domains of one or more DNS hosts represented by said DNS hosts entities.

3. A provisioning method employing a DNS data model for relating DNS entities of a computer network to other DNS entities of the computer network, and for expressing the DNS entities in a form accessible by other network components, the method comprising:
configuring a central database to be able to implement the DNS data model, the DNS data model including:
a plurality of devices entities;
a plurality of DNS hosts entities;
a plurality of DNS host types entities;
a plurality of DNS ACLs entities;
a plurality of DNS ACL entries entities;
a plurality of DNS allow transfers entities;
a plurality of DNS domain types entities;
a plurality of DNS domains entities;
a plurality of DNS allow queries;
a plurality of DNS domain masters entities; and
a plurality of DNS master IPs; and
automatically provisioning the computer network according to the DNS data model.

4. The method of claim 3, further comprising a plurality of DNS configuration entities.

5. The method of claim 3, wherein said DNS hosts entities represent DNS host devices, and wherein said DNS hosts entities relate to:
said DNS host types entities by a many-to-one relationship;
said DNS domains entities by a many-to-one relationship; and
a plurality of configuration entities by an optional one-to-many relationship.

6. The method of claim 3, wherein said DNS host types entities represent allowed DNS host types, and wherein said DNS host types entities relate to said DNS hosts entities in a one-to-many relationship.

7. The method of claim 3, wherein said DNS ACLs entities represent ACLs associated with specific DNS names, and wherein said DNS ACLs entities relate to:
said DNS ACL entries entities by a one-to-many relationship;
said DNS allow transfers entities by a one-to-many relationship; and
said DNS allow queries entities by a one-to-many relationship.

8. The method of claim 3, wherein said DNS ACL entries entities relate to said DNS ACLs entities by a many-to-one relationship.

9. The method of claim 3, wherein said DNS allow transfers entities relate to:
said DNS ACLs entities by a many-to-one relationship; and
said DNS domains entities by a many-to-one relationship.

10. The method of claim 3, wherein said DNS domain types entities represent the allowed types of DNS names for the network, and wherein said DNS domain types entities relate to said DNS domains entities by a one-to-many relationship.

11. The method of claim 3, wherein said DNS domains entities represent the various DNS domains of the network, and wherein said DNS domains entities relate to:
said DNS hosts entities by a one-to-many relationship;
said DNS allow transfers entities by a one-to-many relationship;
said DNS allow queries entities by a one-to-many relationship;
said DNS domain types entities by a many-to-one relationship;
said DNS domain masters entities by a many-to-one relationship; and
a plurality of network entities by an optional many-to-one relationship.

12. The method of claim 3, wherein said DNS allow queries entities represent specific DNS queries allowed on the network, and wherein said DNS allow queries entities relate to:
said DNS domains entities by a many-to-one relationship; and
said DNS ACLs entities by a many-to-one relationship.

13. The method of claim 3, wherein said DNS domain masters entities relate DNS domains represented by said DNS domains entities and DNS master IPs represented by DNS master IPs entities by way of a one-to-many relationship with said DNS domains entities and a many-to-one relationship with said DNS master IPs entities.

14. The method of claim 3, wherein said DNS master IPs entities relate to DNS master IP addresses of the network, and relate to said DNS domain masters entities by a one-to-many relationship.

* * * * *

UNITED STATES PATENT AND TRADEMARK OFFICE
CERTIFICATE OF CORRECTION

PATENT NO. : 7,451,071 B2  
APPLICATION NO. : 09/766615  
DATED : November 11, 2008  
INVENTOR(S) : Glenn Ferguson et al.

Page 1 of 1

It is certified that error appears in the above-identified patent and that said Letters Patent is hereby corrected as shown below:

In column 5, line 36, after "required to" delete "10".

In column 25, line 23, delete "DVC_ROLE BEG_DT" and insert -- DVC_ROLE_BEG_DT --, therefor.

In column 25, line 25, delete "DVC_ROLE END_DT" and insert -- DVC_ROLE_END_DT --, therefor.

In column 34, line 25, delete "1596" and insert -- 1506 --, therefor.

In column 52, line 9, delete "QUEUED_ID" and insert -- QUEUE_ID* --, therefor.

Signed and Sealed this

Fourth Day of August, 2009

JOHN DOLL  
*Acting Director of the United States Patent and Trademark Office*